United States Patent [19]

Watanabe et al.

[11] Patent Number: 5,740,355
[45] Date of Patent: Apr. 14, 1998

[54] TRANSACTION TRACING APPARATUS

[75] Inventors: Yutaka Watanabe; Yasuaki Muraki; Takashi Nakagawa, all of Kawasaki, Japan

[73] Assignee: Fujitsu Ltd., Kawasaki, Japan

[21] Appl. No.: 661,582

[22] Filed: Jun. 4, 1996

[30] Foreign Application Priority Data

Oct. 27, 1995 [JP] Japan ................... 7-279983

[51] Int. Cl.$^6$ ................................ G06F 11/00
[52] U.S. Cl. ................... 395/183.21; 395/183.22; 395/183.15
[58] Field of Search ............ 395/183.15, 183.13, 395/183.14, 183.21, 183.22, 184.01, 200.1, 200.11, 200.13, 969, 200.54, 182.13, 182.14, 182.15, 182.16

[56] References Cited

U.S. PATENT DOCUMENTS

| | | | |
|---|---|---|---|
| 4,636,940 | 1/1987 | Goodwin, Jr. | 395/183.15 |
| 4,752,928 | 6/1988 | Chapman et al. | 395/183.15 |
| 5,067,130 | 11/1991 | Jackson et al. | 395/183.15 |
| 5,101,402 | 3/1992 | Chiu et al. | 370/17 |
| 5,142,673 | 8/1992 | De Angelis et al. | 395/183.15 |
| 5,299,206 | 3/1994 | Beaverson et al. | 395/183.15 |
| 5,331,574 | 7/1994 | Temoshenko et al. | 364/551.01 |
| 5,347,524 | 9/1994 | I'Anson et al. | 395/184.01 |
| 5,361,353 | 11/1994 | Carr et al. | 395/700 |
| 5,365,514 | 11/1994 | Hershey et al. | 371/20.6 |
| 5,375,070 | 12/1994 | Hershey et al. | 395/500 |
| 5,440,688 | 8/1995 | Nishida | 395/183.15 |
| 5,539,907 | 7/1996 | Srivastava et al. | 395/183.14 |
| 5,579,476 | 11/1996 | Cheng et al. | 395/183.15 |
| 5,594,904 | 1/1997 | Linnermark et al. | 395/183.11 |

FOREIGN PATENT DOCUMENTS

| | | | |
|---|---|---|---|
| 0 265 106 | 4/1988 | European Pat. Off. | H04L 11/08 |
| 0 474 932 | 3/1992 | European Pat. Off. | H04L 12/26 |

*Primary Examiner*—Robert W. Beausoliel, Jr.
*Assistant Examiner*—Joseph E. Palys
*Attorney, Agent, or Firm*—Staas & Halsey

[57] ABSTRACT

A collection filter is created by a filter creation module according to instruction from a trace control module, and packet logs are collected by a line collection module. Further, an application log extraction module extracts application logs from packet logs by sequence matching using an extraction filter which contains a sequence filter, a performance analysis module analyzes the application logs using an analysis filter, and a graph display module displays a graph of the results.

17 Claims, 27 Drawing Sheets

| TRANSACTION | ELEMENT TYPE 1 | ELEMENT TYPE 2 | ELEMENT TYPE 3 |
|---|---|---|---|
| SEND<br>RETURN | | | |

FIG. 9
| TRANSACTION | OBJECT OF EXTRACTING | ELEMENT |
|---|---|---|
| TR1 |  | 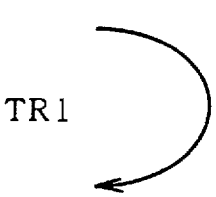 R1 |
| TR2 | | 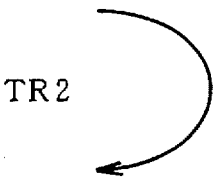 |
| TR3 | |  R6 |

FIG. 13

| TRANSACTION | ELEMENT | SEQUENCE FILTER |
|---|---|---|
| (arc arrow) | R1 (arrow up-right) | tran-type 1:<br>  send {<br>    ( {sa, sp} , {da, dp} )<br>    = ( { ( "client1", 13500 } } , { ( "server", 15890 } } ) ;<br>    = ( { ( "client2", 15000 } } , { ( "server", 15890 } } ) ;<br>    = ( { ( "client3", 11000 } } , { ( "server", 15890 } } )<br>    R1=(off1, len1, data1)<br>  } |
|  | R2 (arrow down-right) | recv {<br>    ( {sa, sp} , {da, dp} )<br>    = ( { ( "server", 15890 } } , { ( "client1", 13500 } } ) ;<br>    = ( { ( "server", 15890 } } , { ( "client2", 15000 } } ) ;<br>    = ( { ( "server", 15890 } } , { ( "client3", 11000 } } )<br>    R2=(off2, len2, data2)<br>  } |

FIG. 14

| TRANSACTION | ELEMENT | SEQUENCE FILTER |
|---|---|---|
| | R1 ↗ | tran-type 2:<br>send {<br>  ( {sa, sp} , {da, dp} )<br>  = ( { ("server", 15890) , ("client", 12350) } )<br>  R1=(off1, len1, data)<br>} |
| ⌒↘ | ↘ | recv {<br>  ( {sa, sp} , {da, dp} )<br>  = ( { ("client", 12350) , ("server", 15890) } )<br>  R2=( *, *, * )<br>} |

FIG.16

| TRANSACTION | ELEMENT | SEQUENCE FILTER |
|---|---|---|
| ⌢→ | R1 ↗ | tran-type 1:<br>send (<br>  ( {sa, sp} , {da, dp} )<br>  = ( ( * , * ) ; ( * , * ) )<br>  R1=(off1, len1, data1)<br>) |
| | R2 ↘ | recv (<br>  ( {sa, sp} , {da, dp} )<br>  = ( ( * , * ) ; ( * , * ) )<br>  R2=(off2, len2, data2)<br>) |

TRANSACTION TRACING APPARATUS

BACKGROUND OF THE INVENTION

The present invention relates to a transaction tracing apparatus which collects and analyzes the performance of transactions being conducted between a server and clients connected to a local area network or such other transfer lines, and particularly relates to transaction tracing apparatus which can extract and analyze application logs without giving consideration to the differences in protocol or application.

Known computer network systems comprised of a server and multiple clients connected via a network such as a LAN conduct processing of transactions by means of exchanging conversational information of requests and replies. Accordingly, with known systems, in the event of conducting network management or in the event that trouble occurs, communication information is gathered from the lines, and the contents of this communication information is analyzed. Further, if particular transactions can be extracted and subjected to response analysis or data volume analysis, regarding the communication information gathered from the lines, the state of processing on the computer network related to a particular system or particular job can be appropriately understood, so that system restructuring or alteration of operational configuration can be undertook, consequently allowing for appropriate load placement.

However, the transactions between the server and clients which are taking place on the line in the form of communication information conducted as conversation, is such that transmits the contents of transactions executed within application programs according to a particular protocol, and in order to extract and analyze a particular transaction from the communication information collected from the lines, unique analysis programs have had to be created which take into consideration both the protocol and the application. Further, in order to create a program which analyses transactions as an application, a high level of knowledge is required regarding the protocol employed with the system concerning which analysis is to be conducted. Moreover, there are various protocols which are employed for server-client systems, and a dedicated analysis program has been necessary for each protocol. Moreover yet, there are cases where some vendors do not disclose the contents of their protocols, and in such cases, analysis programs could not be created.

SUMMARY OF THE INVENTION

According to the present invention, a transaction tracing apparatus can be provided which is capable of easily extracting and analyzing an application log for a desired transaction from communication information collected from a transmission circuit, without consideration of protocol or application.

To begin with, the present invention relates to a transaction tracing apparatus which conducts transaction processing in an arrangement wherein a server and a plurality of clients are connected via a transmission path, in which transmission information, e.g., packet information is exchanged according to a conversational format of request and reply between the server and clients. The tracing apparatus of the present invention is comprised of a trace control module, a filter creation module, a line collection module, an application log extraction module, a performance analysis module, and a graph display module. The trace control module conducts overall control of the apparatus based on a trace instruction file. The trace instruction file stores the log file name, filter file name, and various specification information for analysis instructions. Here, the analysis filter name is specified as the filter file name. Also, the analysis instructions are comprised of analysis type and layout. Of these two, the analysis type includes response analysis, through-put analysis, client processing time, server processing time, transaction transition, etc., and the layout information includes comments, threshold value, display position, size, etc. The filter creation module creates extraction filters and analysis filters to be employed for extraction of a specific conversation sequence. The extraction filter employed with the application log extraction module is comprised of transaction name, time specification, and sequence filter. The extraction filter employed with the performance analysis module is the same as that employed with the application log extraction module, and is comprised of transaction name, time specification, and sequence filter. The sequence filter for the extracting and analyzing filters is information indicating conversation being sent and information indicating conversation returning, i.e., one pair. For conversation comprised of multiple packets, the sequence filter can be employed for extraction as one set of conversation. Further, multiple conversations can also be extracted as one set of conversation. Both the send information and returning information of the sequence filter are comprised of; directional information which is comprised of originating information and receiving information, these both being comprised of system address and protocol identifier; identification data; and sequence information containing the position and length thereof. Further, multiple pairs of send information and returning information can be set for singular sequence information. Thus, conversation between a plurality of systems can be extracted with a single sequence filter. The filter creation module is provided with pattern filters for each protocol to begin with, so that the user can create sequence filters easily by means of using these pattern filters. The pattern filters have registered therein elements corresponding to the send information and returning information for each of the protocols. Thus, a sequence filter is automatically created by means of selecting corresponding elements from the pattern filter based on user protocol selection and element selection, and further, by means of selecting corresponding elements from the selection elements based on input of user system address, protocol identifier, identification data, and time. Moreover, the filter creation module can also create line collection filters to be used for collection of packet logs. The line collection module collects from the transmission path communication information as specified by the collection filter, in the form of communication logs. The collection filter is comprised of at least: collection time; originating information of originating system address and originating protocol identifier; and receiving information of receiving system address and reception protocol identifier. The line collection module collects communication information corresponding to any one of the pieces of collection information within the filter, or a combination of multiple pieces thereof, in the form of a communication log. and creates a packet log. The application log extraction module extracts, by means of sequence matching, specific conversation sequence packets specified by the extraction filter, from the packet log extracted by means of the line collection module, in the form of application log. The performance analysis module extracts a specific conversation sequence from the application log as specified by the analysis filter, and analyzes the performance of the transaction. The performance analysis module conducts response analysis, through-put analysis, client processing time, server processing time, transaction transition, etc., as necessary. The graph display module displays a graph on the display according to the performance analysis results. Further, the trace control module possesses a trace hysteresis file, and in the event that displaying of a graph of analyzed performance other than that of the information specified by the trace instruction file is conducted within the graph display module, this graph information is stored in the trace hysteresis file. Within the trace hysteresis file is stored trace operation information not specified in the trace instruction file, such as range extraction and graph overlaying, etc., so that special trace operation information stored in the trace hysteresis file can be applied to subsequent graph displaying.

The above and other objects, features, and advantages of the present invention will become more apparent from the following detailed description with reference to the drawings.

BRIEF DESCRIPTION OF THE DRAWINGS

FIG. 9 is an explanatory diagram of a sequence filter which extracts multiple transactions collectively;

FIG. 13 is a descriptive explanatory diagram of the sequence filter which extracts transactions from multiple clients;

FIG. 14 is a descriptive explanatory diagram of the sequence filter in the event that the send information is clear but the returning information is not determined;

FIG. 16 is a descriptive explanatory diagram of the sequence filter which extracts transactions from between all clients and the server;

DETAILED DESCRIPTION OF THE PREFERRED EMBODIMENT

Figure 1:
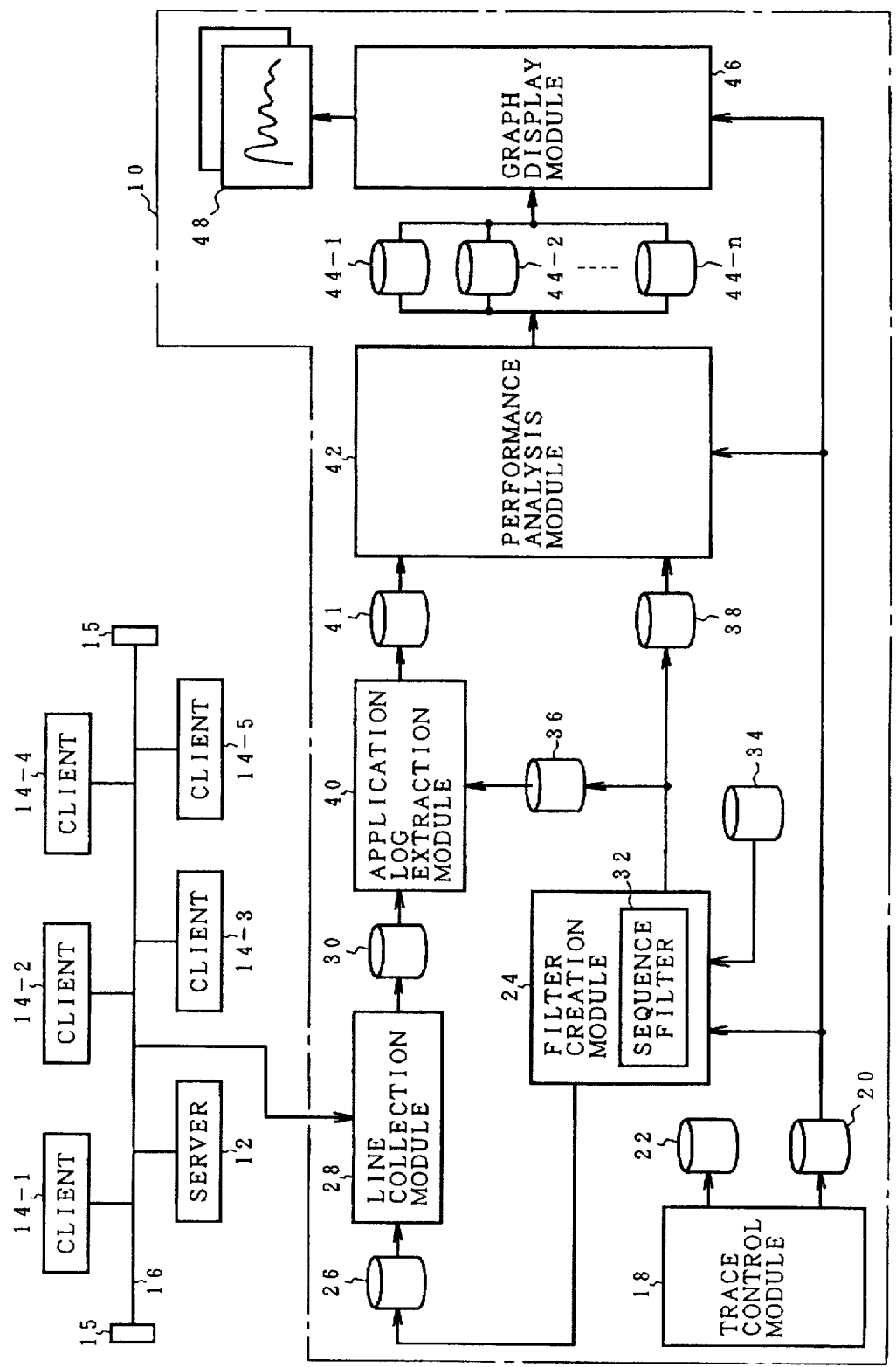
FIG. 1 is a block diagram showing the process functions of the present invention.

FIG. 1 is a block drawing of a preferred embodiment of the trace apparatus of the present invention. In a computer network such as that comprised of a server 12 and clients 14-1 through 14-5 connected via a transmission path 16 for example, i.e., a server-client system, the tracing apparatus 10 is employed for tracing transactions from the clients 14-1 through 14-5 to the server 12. The like of a local area network, for example, is employed for the transmission path 16, and both ends of the transmission path 16 are terminated by means of terminators 15. Further, the transmission path 16 may also be connected to an external network, constructing an Internet Protocol network (IP network), for example. Within the server-client system, exchange of conversation streams regarding the like of requests for issuing slips or retrieval requests provided by application programs, for example, is conducted by means of exchange of packet information following a protocol from clients 14-1 through 14-5 to the server 12. The tracing apparatus 10 is comprised of a trace control module 18, a filter creation module 24, a line collection module 28, an application log extraction module 40, a performance analysis module, 42, and a graph display module 46. File information provided to be used with the tracing apparatus 10 includes trace instruction file 20, trace hysteresis file 22, packet log 30, application log 41, and performance report files 44-1 through 44-n. Further, filters to be used with the tracing apparatus include a collection filter 26, a sequence filter 32, a pattern filter 34, an extraction filter 36, and an analysis filter 38. The trace control module 18 conducts overall control of the tracing apparatus 10.

Figure 2:
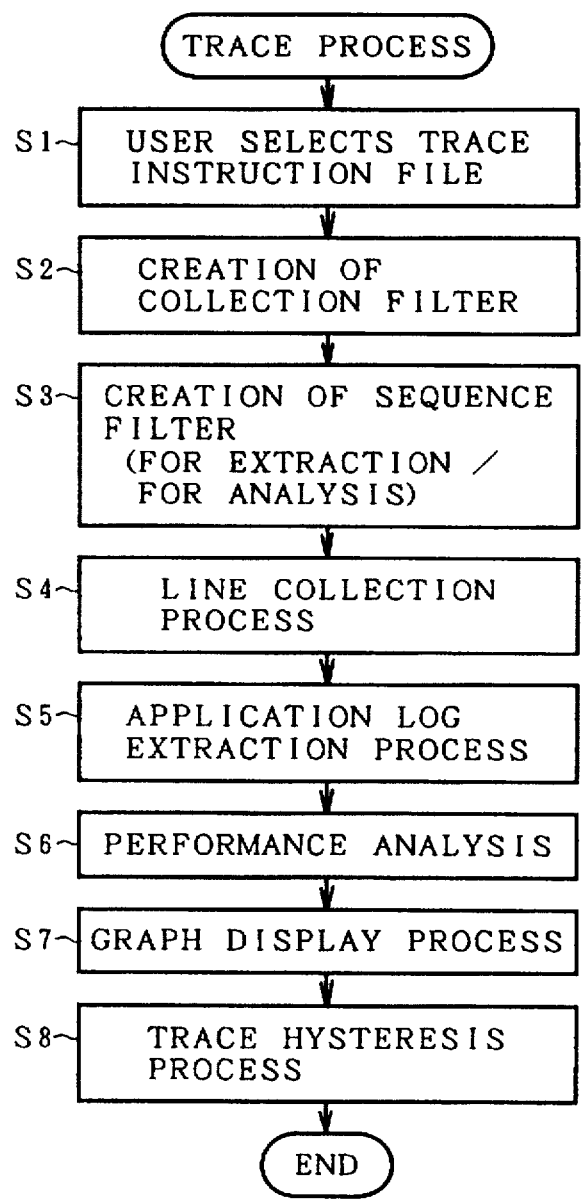
FIG. 2 is a flowchart showing the trace process of the present invention.

FIG. 2 is a flowchart which shows the series of control processes of the tracing apparatus 10 according to the trace control module 18. When the user selects the trace instruction file 20 in the initial step S1, creation of a collection filter 26 is first conducted in step S2 by means of the filter creation module 24, according to the contents of the selected instruction file. Next, in step S3, the filter creation module 24 creates a sequence filter 32. When the sequence filter 32 has been obtained, the extraction filter 36 which contains this sequence filter 32, along with the analysis filter 38, are immediately obtained. Next, in step S4, the line collection module 28 is activated, and packets are collected from the transmission path 16 based on the collection filter 26, and a packet log 30 is created. Subsequently, in step S5, the application log extraction module 40 uses the extraction filter 36 to extract from the packet log 30 an application log 41 comprised of a group of packet records corresponding to the conversation sequence specified by the extraction filter 36. In other words, since the data stream of conversation according to an application is segmented into multiple packets which are collected as packet log 30, the extraction filter 36 is applied to this packet log 30, whereby multiple packet records which comprise a single conversation sequence are extracted, and stored as application log 41. In step S6, the performance analysis module 42 is activated, and, after conducting extraction of conversation sequence to be analyzed again as necessary by means of the analysis filter 38 containing the sequence filter 32, regarding the conversation data stream comprised of collective packet records of the application log 41, performance analysis processing is conducted at the performance analysis module 42. Performance report files 11-1 through 44-n are created by means of the processing by this performance analysis module 42. Next, in step S7, the display module 46 is activated, and graph displaying 48 is conducted as necessary, based in the contents of the performance analysis files 44-1 through 44-n. In the event that special graph display is conducted here that is according to other than the instruction contents of the trace instruction file 20, the graph display information is stored in the trace hysteresis file 22 provided in the trace control module 18 as a hysteresis file, in such a manner that the saved information can be re-used. The hysteresis information which is stored in the trace hysteresis file 22 can be reflected on the trace instruction file 20 as necessary.

Figure 3:
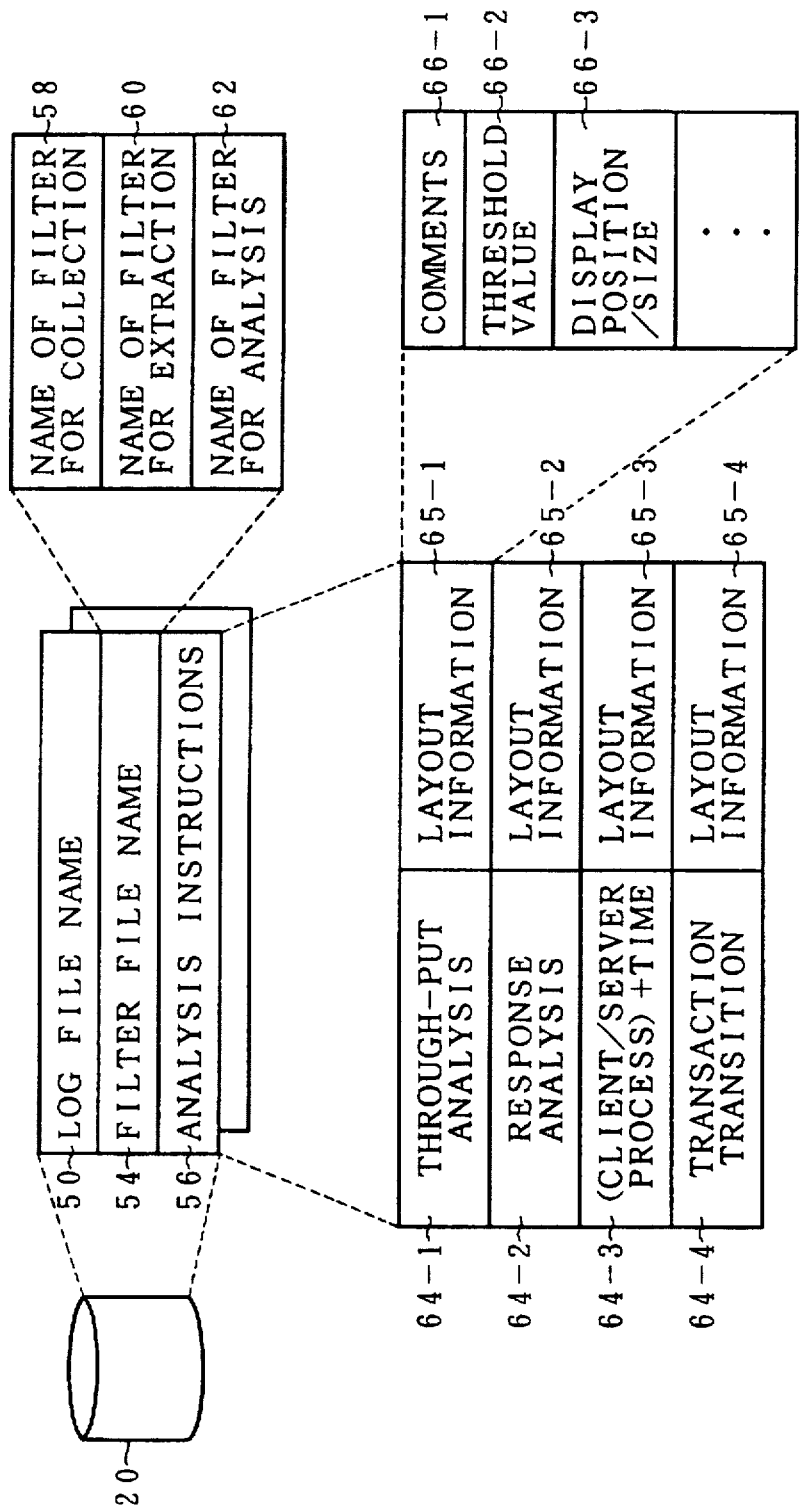
FIG. 3 is an explanatory diagram of the trace instruction file shown in FIG. 1.

FIG. 3 is the configuration of the trace instruction filter 20 provided to the trace control module 18 shown in FIG. 1. The trace instruction filter 20 is comprised of a log file name 50, a filter file name 54, and analysis instructions 56. The filter file name 54 is made up of an collection filter name 58, an extracting filter name 60, and an analysis filter name 62, as shown to the right. The analysis instructions 56 are provided with through-put analysis 64-1, response analysis 64-2, client/server processing time 64-3, and transaction transition 64-4, etc., as described at the bottom, with each combined with layout information 65-1 through 65-4. As shown regarding the layout information 65-1 through 65-4, the layout information specifies comments 66-1, threshold value 66-2, display position/size 66-3, etc. The trace control module 18 shown in FIG. 1 conducts overall control of the tracing apparatus 10 following user selection related to the trace instructions file 20 shown in FIG. 3, according to the flowchart shown in FIG. 2, by means of employing information such as the log file name 50, filter file name 54, and the analysis instructions 56.

Figure 4:
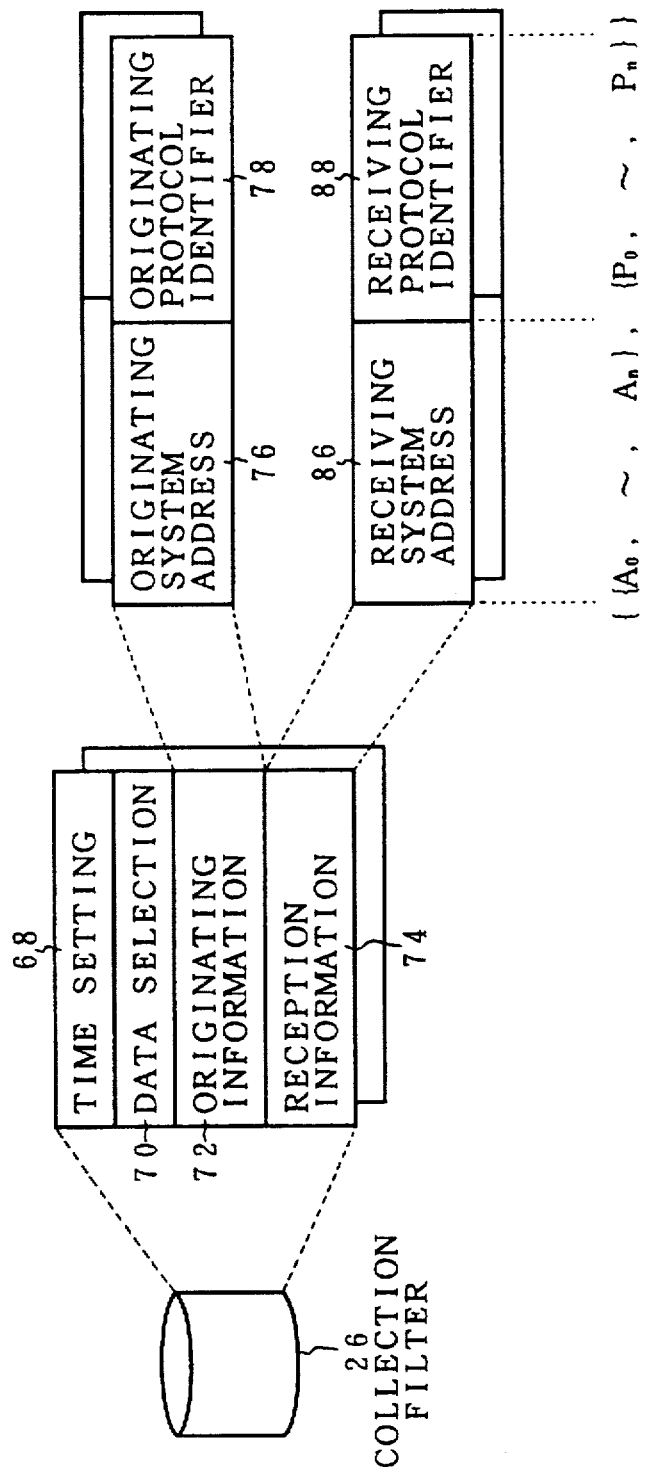
FIG. 4 is an explanatory diagram of the collection filter shown in FIG. 1.

FIG. 4 is the configuration of the collection filter 26 created by the filter creation module 32 shown in FIG. 1. The collection filter 26 is comprised of time setting 68, data selection 70, origination information 72, and receiving information 74. The time setting 68 sets the time to initiate packet collection on the transfer path 16 and the time to quit. Now, data selection 70 is for specification in the cast that part of the data is known, allowing for removal of unnecessary packets by means thereof. The originating information 72 is, as shown to the right, comprised of the originating system address 76 and originating protocol identifier 78. The receiving information 74 is, in the same way, comprised of the receiving system address 80 and receiving protocol identifier 82. Regarding the line collection module 28 shown in FIG. 1, if there is a packet which matches with any one or more of the collection filters 26 shown in FIG. 4, such packet is collected from the transfer path 16, and is stored in the packet log 30. Further, the collection module 28 may also conduct packet collection without employing line collection filter 26. For example, starting and quitting of a log can be instructed by means of operator operations. Moreover, a packet log 30 which has been collected by another system may be used, with the line collection module 28 not being provided at all.

Figure 5:
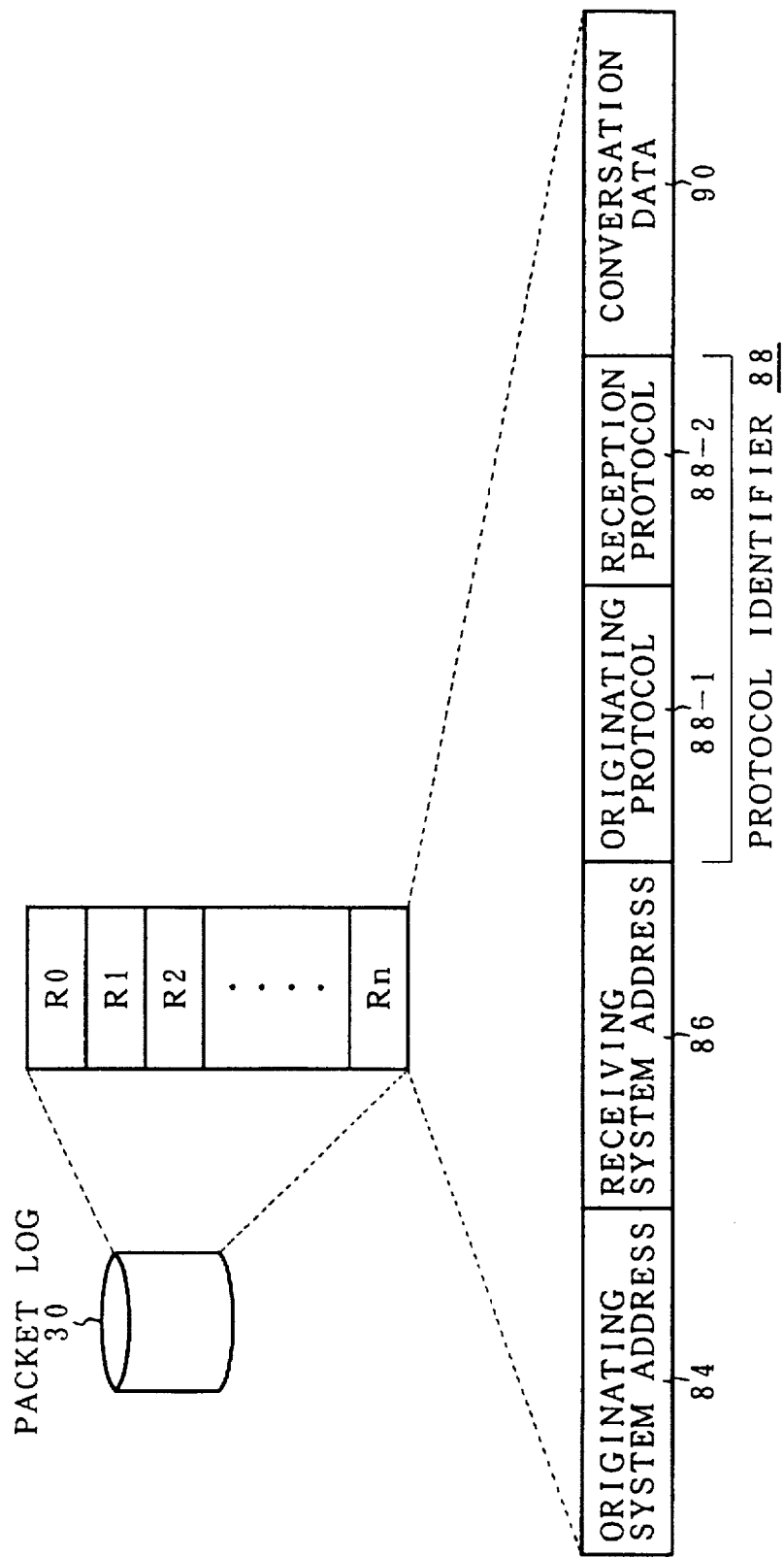
FIG. 5 is an explanatory diagram of the packet log shown in FIG. 1.

FIG. 5 is the configuration of the packet log 30 shown in FIG. 1. The packet log 30 records packets upon the transfer path 16 in the unit of records, with records R0 through Rn being stored, for example. Each of the records R0 through Rn are, as shown by extracting record Rn, comprised of an originating system address (originating unit address) 84, receiving system address (receiving unit address) 86, protocol identifier 88, and conversation data 90. The protocol identifier 88 is comprised of an originating protocol 88-1 and reception protocol 88-2.

Figure 6:
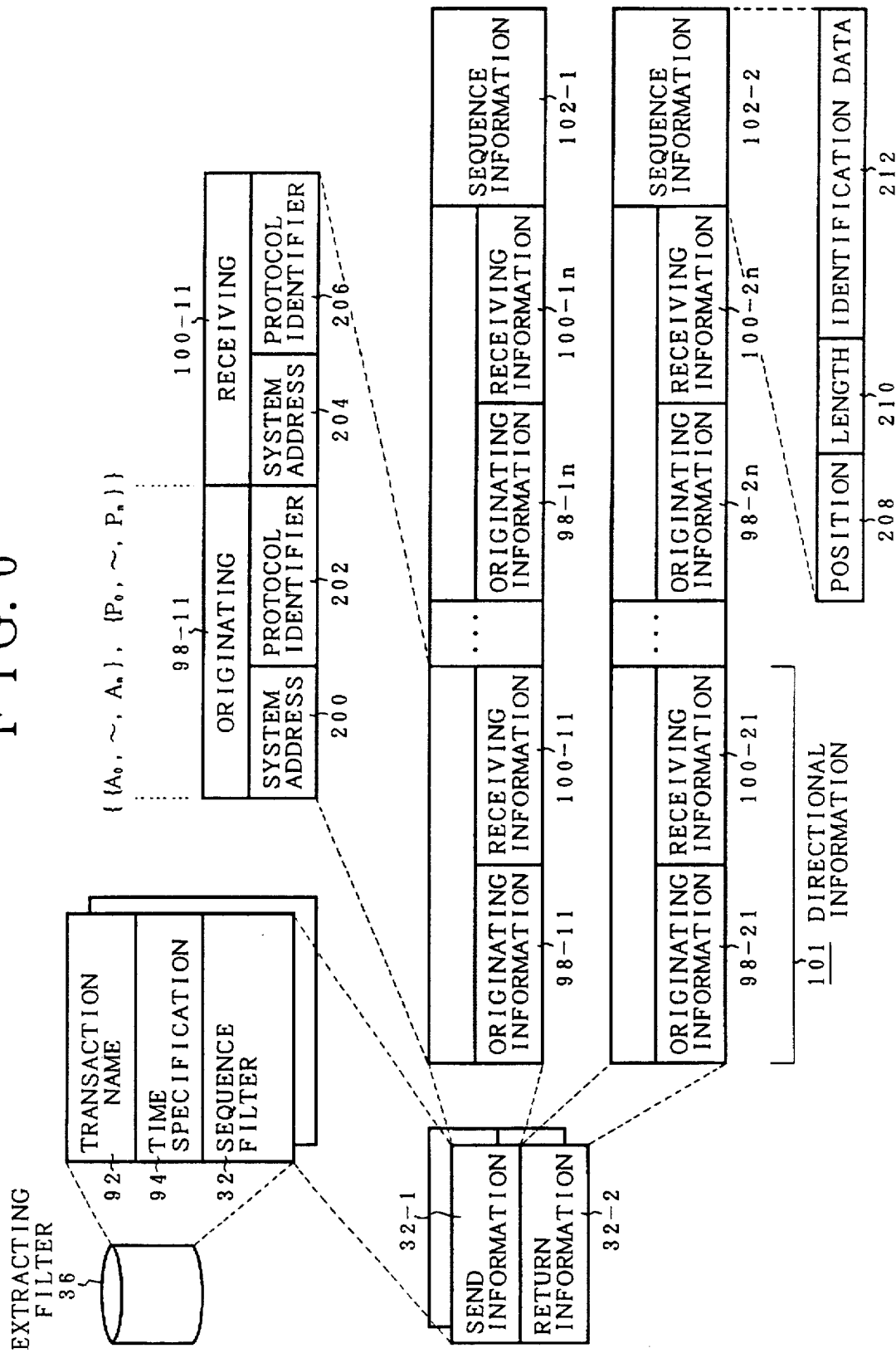
FIG. 6 is an explanatory diagram of the extraction filter shown in FIG. 1.

Next, description will be Given with reference to FIG. 1 regarding creating of a sequence filter 32 according to the filter creation module 24, and an extraction filter 36 to be used with the application log extraction module 40 which employs the sequence filter 32. Now, the filter creation module 24 creates an analysis filter 38 simultaneously with the extraction filter 36, but these are the same except for the case where the usage of the analysis filter 38 is for the performance analysis module 42. Accordingly, the creation of an extraction filter 36 will be giving as an example following the filter creation module 24. FIG. 6 is a the configuration of the extracting filter 36 which is created by means of the filter creation module 24 shown in FIG. 1. The extracting filter 36 is comprised of transaction name 92, time specification 94, and sequence filter 32. The transaction name 92 is specified by specifying the transaction name of the transaction to be extracted from the packet log 30. The time specification 94 allows for arbitrary setting of extraction time, with the time setting for packet log 30 being the maximum range. The sequence filter 32 is comprised of the pair of send information 32-1 and return information 32-2, which corresponds with the conversation sequence of the transaction to be extracted being comprised of the pair of send and return. The send information 32-1 is comprised of either singular or multiple pair(s) of send and return information, and a single piece of sequence information. In the case of FIG. 6, the send information 32-1 is comprised of multiple pairs of originating information 98-11 through 98-1n and receiving information 100-11 through 100-1n, and, a single piece of sequence information 102-1. The return information 32-2, as well is comprised of multiple pairs of originating information 98-21 through 98-2n and receiving information 100-21 through 100-2n, and, a single piece of sequence information 102-2. The originating information is, as described regarding the originating information 98-11, comprised of the pair of system address 200 and protocol identifier 202. In the same way, the receiving information is, as described regarding the receiving information 100-11, also comprised of the pair of system address 204 and protocol identifier 206. The directional information 101 is, as shown by the return information 32-2, for example, comprised of originating information 98-21 and receiving information 100-21, and can identify if the direction of conversation is being sent or is returning. The sequence information 102-1 and 102-2 are for determining the sequence of the conversation to be extracted, and, as is shown regarding the sequence information 102-2, contains identification data 212 which determines the content of the conversation stream, position 208 of the identification data 212, and length (bytes) 210 of the identification data.

Figures 7A, 7B:
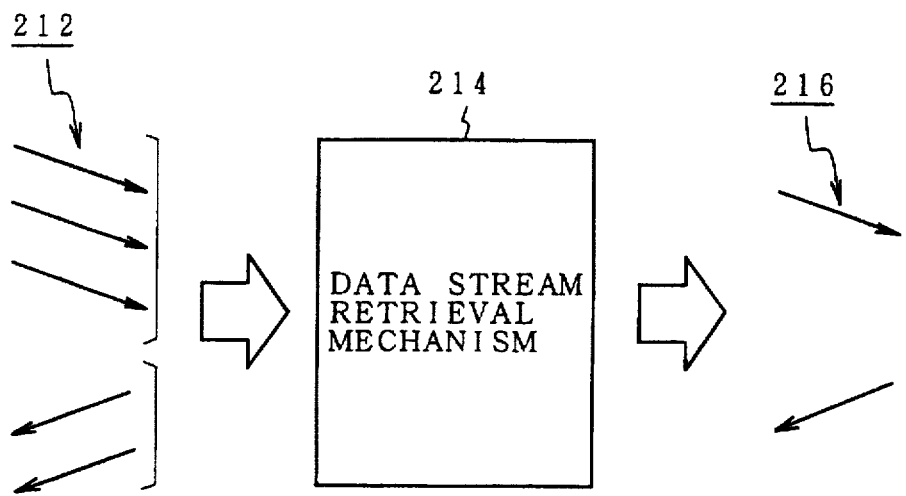
FIGS. 7A and 7B are explanatory diagrams of the sequence filter shown in FIG. 6 which possesses singular directional information.
Figure 8:
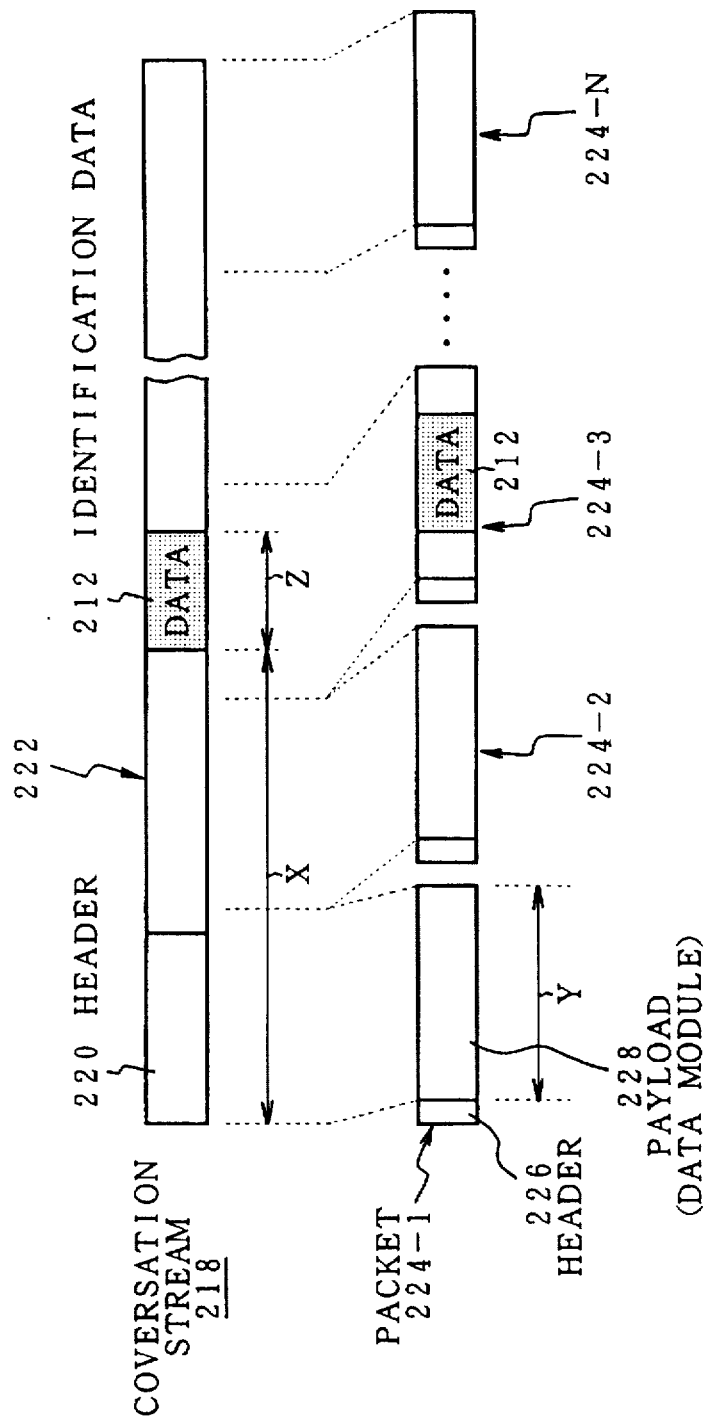
FIG. 8 is an explanatory diagram of conversion from packet record to data stream and also of the basic elements of the sequence filter shown in FIG. 7.

FIG. 7A and FIG. 7B shown the retrieval mechanism for extracting conversation data stream for packet records in the application log extraction module 40 of the present invention, and the basic elements of the sequence filter 32 of the present invention, by outbound and returning packets. First, FIG. 7A is the data stream retrieval mechanism 214 which is provided to the application log extraction module 40. Multiple packet records read from the packet log 30 are input, and the corresponding packet record 216 is found by means of conducting retrieval of the conversion extraction employing the sequence filter 32 of the present invention. i.e., as shown in FIG. 8, a single conversation stream 218 which is provided by an application is generally provided with the data stream 222 inserted following the header 220 unique to the protocol, and identification data 212 unique to the protocol is provided within the data stream 222. The position 208 of this identification data 212 is known beforehand as offset, such as being X bytes from the leading end, etc. Such a conversation stream 218 is segmented and inserted into packets 224-1 through 224-N, comprised of a header 226 of a predetermined byte length and a payload (data portion) 228, which packets are then sent to the transfer path. With the tracing apparatus of the present invention, these packets 224-1 through 224-N are collected, and the conversation stream 218 is supposed from the payload 228, whereby the existence of identification data 212 set in the sequence filter is retrieved. For example, in the event that there is retrieval that identification data 212 exists in packet 224-3, this means that one conversation stream 218 has been retrieved. Specifically, if it is supposed that the position of the identification data 212 of the conversation stream 218 is X bytes, and the payload 228 of the packets 224-1 through 224-N is Y bytes, the following expression reveals that identification data 212 exists in packet No. K from the leading end:

$$K = INT\ [X/Y] + 1 \quad (1)$$

wherein INT refers to integration of the calculation results within the parentheses [].

Accordingly, instant retrieval can be conducted regarding whether the conversation stream is the conversation stream to be extracted, by means of reading the packet No. K from the leading end as calculated in the aforementioned expression (1), and conducting pattern matching with the sequence filter identification data 212. Further, in the event that the conversation stream 218 has been cut into fixed-length bytes Y thereby creating packets 224-1 through 224-N, there is the possibility that the segmentation has taken place partway through the identification data, and that the identification data 212 exists separately in two packets. Here, with the identification data 212 length as Z, the calculations are performed:

$$K1 = INT\ [X/Y] + 1 \quad (2)$$

$$K2 = INT\ [(X+Z)/Y] + 1 \quad (3)$$

In the event that the identification data is separated into two packets, K1 and K2 of the expressions (2) and (3) do not agree, so pattern matching of identification data is conducted with the payload of the two packets No. K1 and No. K2 being synthesized. Thus, conversation stream retrieval can be accurately conducted by identification data matching, by means of reading the two corresponding packets and synthesizing the payload data.

FIG. 7B shows the basic element types of the sequence filter 32 as corresponding to a single transaction which is comprised of outbound and returning conversation. With Element Type 1, the sequence information is specified as shown by the dots, in the case that the sending and returning of the application conversation information is known. With Element Type 2, specification is made in the case where the sending of the application conversation information is known, and the return is not determined. Inversely, with Element Type 3, specification is made in the case where the return of the application conversation information is known, and the sending is not determined. FIG. 9 is an example of application of basic element types shown in FIG. 7B. This sequence filter is an element which extracts 3 separate transactions, TR1, TR2, and TR3, as a single group, and is capable of extracting conversations to a server from multiple clients, as a single group. In this way, the sequence filter 32 according to the present conversation is capable of not only conducting extraction of transactions by basic element types as shown in FIG. 7B, but also capable of creating a sequence filter for extracting a combination of multiple transaction as a single group, as shown in FIG. 9

Figure 10:
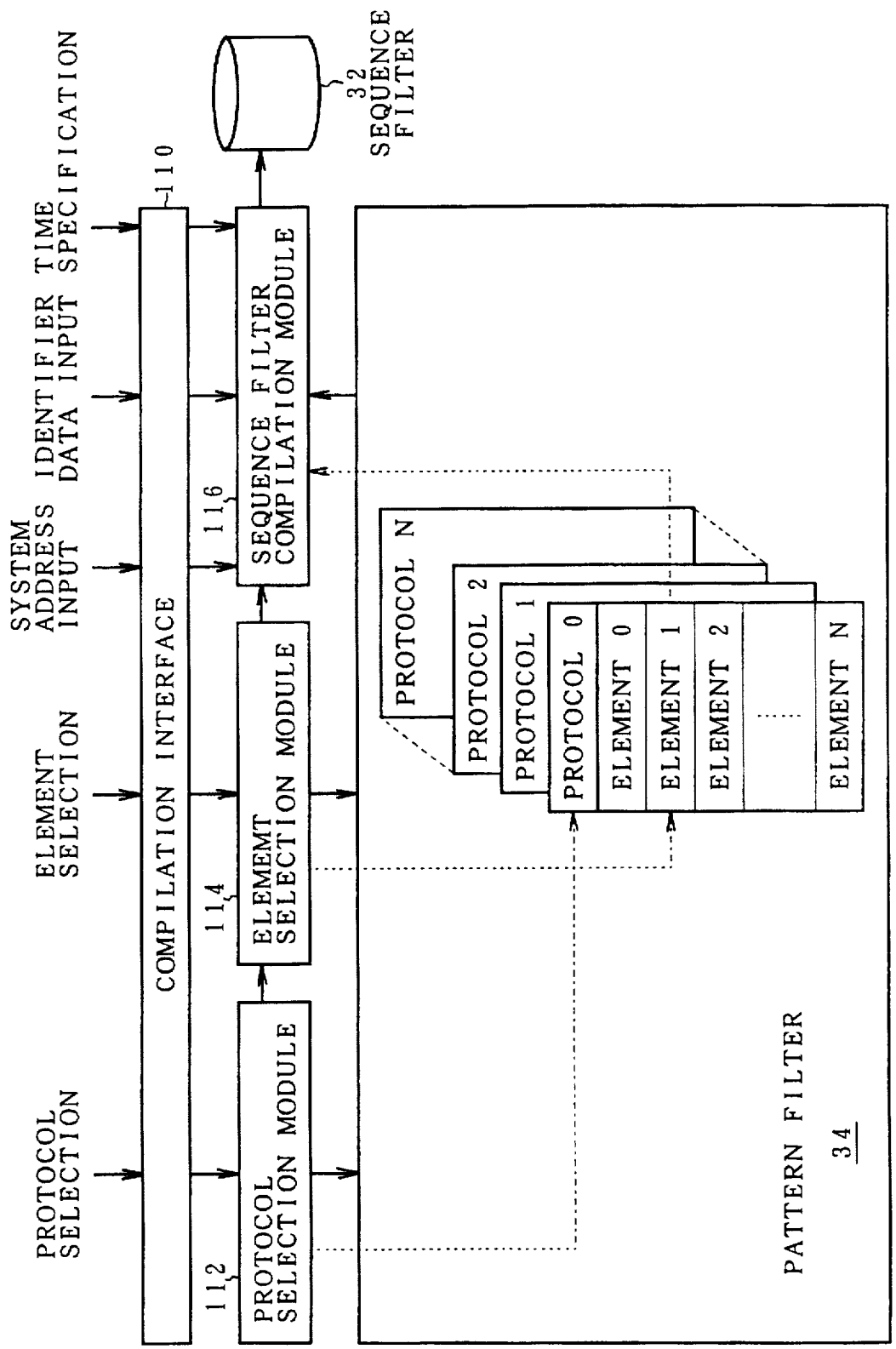
FIG. 10 is a functional block diagram of sequence filter creation by means of the filter creation module shown in FIG. 1.
Figure 11:
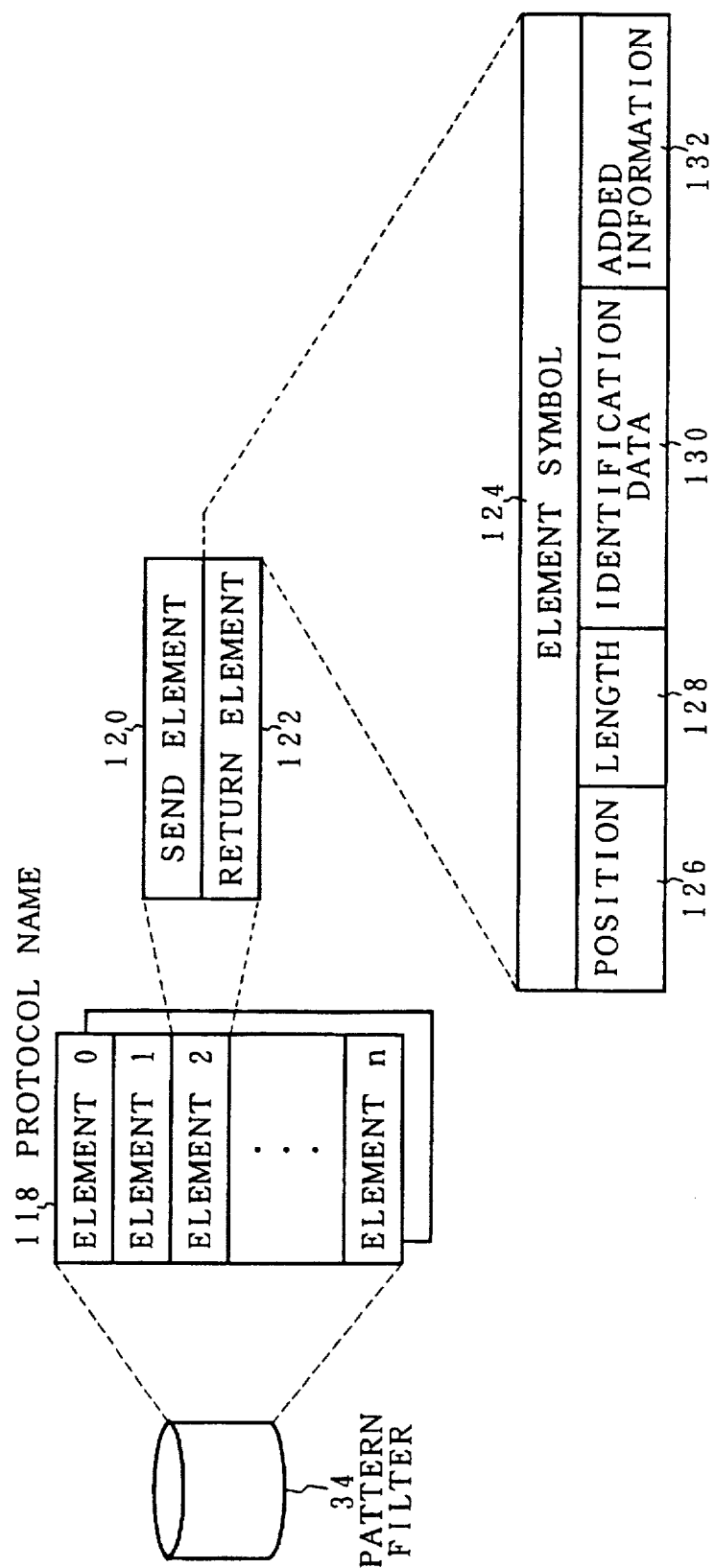
FIG. 11 is an explanatory diagram of the pattern filter shown in FIG. 1.

FIG. 10 shows a function block for creating a sequence filter 32 using a pattern filter 34 in the filter creation module 24, shown in FIG. 1. The function block for creating a sequence filter 32 is comprised of a compilation interface 110, protocol selection module 112, element selection module 114, and sequence filter compilation module 116. Here, the pattern filter 34 is made up as shown in FIG. 11. In FIG. 11, the pattern filter 34 has pre-registered combinations of elements meeting protocols as element 0 through n, these elements being such as, with regard to the protocol name 118, element types which are for basic element types such as shown in FIG. 7B or for multiple transactions such as shown in FIG. 9. Each of the elements 0 through n is comprised of a send element 120 and return element 122, as described with element 2 in the Figure. The send element 120 and return element 122 are comprised of an element symbol 124, position 126, length 128, identification data 130, and added information 132, as described with return element 122 in the Figure. Here, position 126 refers to the position within the data stream of the identification data 130, and length 128 refers to the data length of the identification data 130. Further, the identification data may be non-defined for either one or the other of send or return.

Returning to reference of FIG. 10, pre-registered to pattern filter 34 are the pattern filters of the configuration as described in FIG. 11, in units of, for example, protocol 0 through N. First, the user makes protocol selection regarding the compilation interface 110. Receiving this protocol selection, the protocol selection module 112 refers to the pattern filters 34, and selects the pattern filter, for example, for protocol 0. Next, the user makes element selection regarding the compilation interface 110. The element selection module 114, upon receiving this element selection, selects, for example, the element 1 specified within the protocol 0 selected by means of the protocol selection module 112, and outputs to the sequence filter compilation module 116. The user has further conducted system address input, identification data input, and time specification, to the compilation interface 110. These three pieces of information are handed to the sequence filter compilation module 116, and by means of combining these with the Element 1 selected from the pattern filter 34, a sequence filter 32 of the make-up shown in FIG. 6 can be created.

Figure 12:
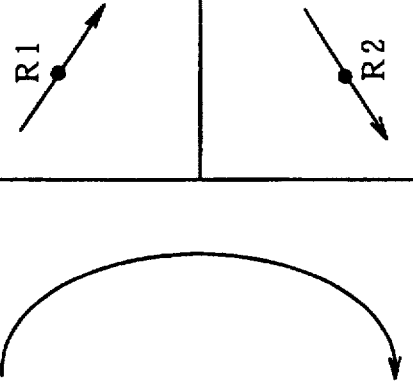
FIG. 12 is a descriptive explanatory diagram of the sequence filter in the event that the outbound and returning information is known.
Figure 15:
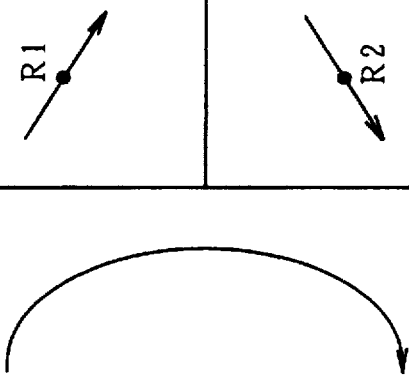
FIG. 15 is a descriptive explanatory diagram of the sequence filter which extracts transactions from all clients.
Figure 17:
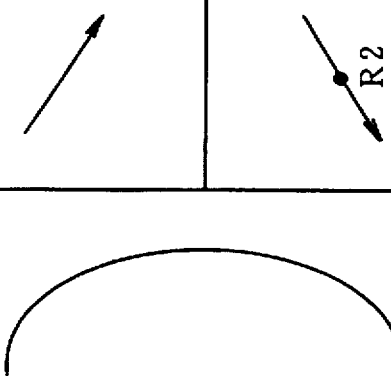
FIG. 17 is a descriptive explanatory diagram of the sequence filter in the event that the send information is uncertain but the returning information is clear.

FIG. 12 through FIG. 17 shows a specific example of a sequence filter created in FIG. 10 along with the transaction and outbound and return conversation sequence elements. In the case of FIG. 12, the element is Element Type 1, wherein both the send information and return information was known. Here, regarding this sequence filter, the transaction name is "tran-type 1". The send information "send" is described as follows: the system address "sa" and the protocol identifier "sp", which comprise originating information, and the system address "da" and the protocol identifier "dp", which comprise receiving information, are each described as "client, 12350, server, 15890", respectively. Finally, position "off1", length "len1", and identification data "data1" are described as sequence information R1. Following the return information "recv", system addresses and protocol identifiers are described in reverse to the send information, and further, position "off2", length "len2", and identification data "data2" are described as sequence information R2. FIG. 13 is a sequence file which extracts transactions from multiple clients, regarding Element Type 1. In this example, transactions are extracted from between 3 clients "client 1, 2, 3", and a server "server". FIG. 14 is an example of Element Type 2 where the send information is known and the return information is not determined. Since the return information is not determined, an asterisk "*" has been put in for the position, length, and identification data of the sequence information R2. FIG. 15 is according to Element Type 1, and is a sequence filter which extracts transactions from all clients. i.e., the send information and the return information is set as "*", thereby extracting transactions from all clients. FIG. 16 is according to Element Type 1, and is a sequence filter which extracts transactions from between all clients and the server. i.e., the originating information and the receiving information is all set as "*", thereby extracting transactions from between all clients and the server. FIG. 17 is an example of Element Type 3 where the send information is not determined and the return information is known. Since the send information is not determined, an asterisk "*" has been put in for the position, length, and identification data of the sequence information R1. The sequence filter 32, which has been compiled in such a manner, is placed into the extracting filter 36 as shown in FIG. 6, and, in the application extraction module 40 shown in FIG. 1, the sequence for the conversation stream from the send element of the sequence filter 32 to the return element thereof is extracted by means of sequence matching of the sequence filter 32 against the packet log 30, and a log record corresponding to each of the finally extracted conversation streams is read from the packet log 30 and is store as an application log 41.

Figure 18:
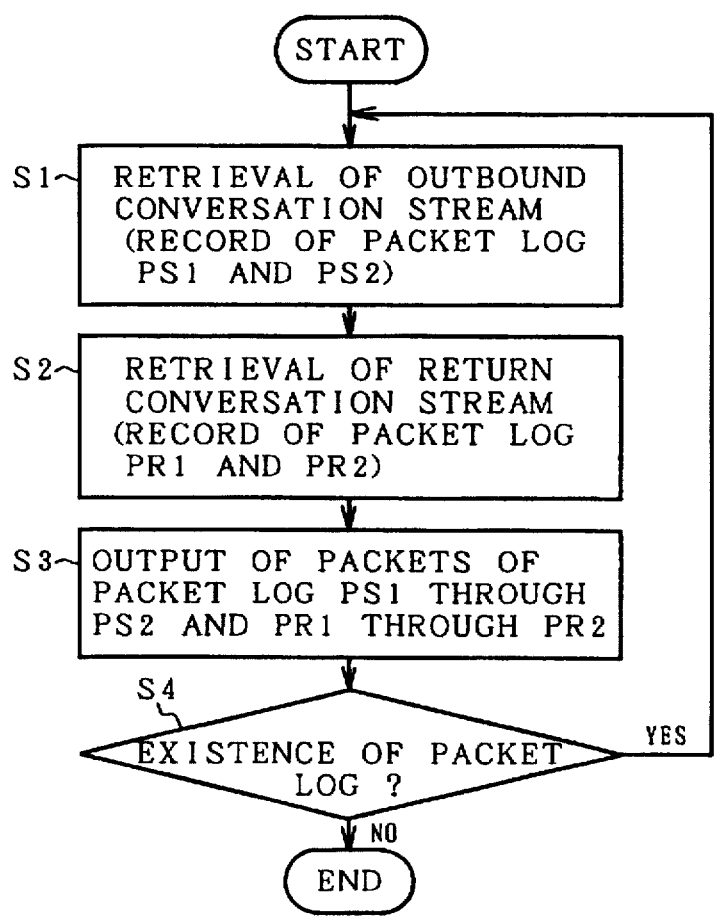
FIG. 18 is a flowchart showing the retrieval process of the application extraction module shown in FIG. 1.
Figure 19:
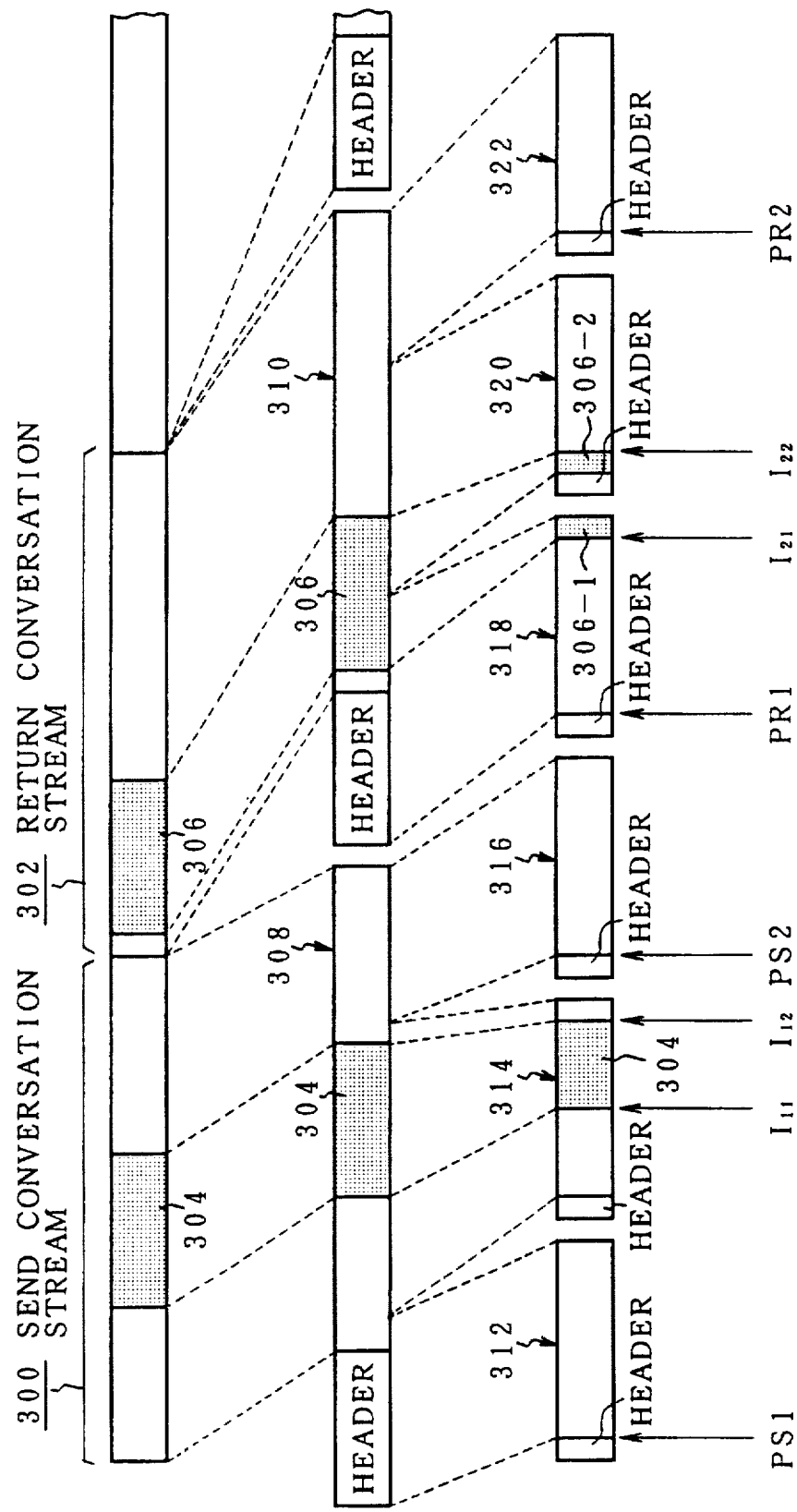
FIG. 19 is a corresponding explanatory diagram of the conversation streams, protocol packets, and communication packets, which are the objects of the present invention.

FIG. 18 is a flowchart showing the processing of the application extraction module 40 which extracts transactions of conversation sequences, using the Element Type 1 sequence filter shown in FIG. 7B, which has identification data set to each of the send and return elements. FIG. 19 shows the conversation stream, protocol packet stream, and packet log stream, which are to be the object of the retrieval process shown in FIG. 18. The send conversation stream 300 and the return conversation stream 302, which are provided as applications, respectively posses identification data 304 and 306. This send conversation stream 300 and the return conversation stream 302 are segmented into send conversation protocol packets 308 and return conversation protocol packets 310, by means of a protocol which serves as middleware. Further, the protocol packet 308 is segmented into network packets 312, 314, and 316, and the protocol packet 310 is also segmented into network packets 318, 320, and 322. Packets 312 through 322 are collected in the packet log 30 of the present invention.

Step S1 in FIG. 18 is conducted regarding retrieval packets 312 through 316 of the send conversation stream 300, and the starting packet log PS1 and the finishing packet log PS2 are recorded. At this time, the offsets I11 and I12 which indicate the starting position and ending position of the identification data 304 are recorded, as well. In step S2, retrieval of return conversation stream 302 is conducted concerning packets 318 through 322, and the starting packet log PR1 and the ending packet log PR2 are recorded. At this time, the offsets I21 and I22 which indicate the starting position and ending position of the identification data 306 are recorded, as well. Here, the identification data 306 of the return conversation stream 302 is segmented into packets 318 and 320, and exists as identification data 306-1 and 306-2. When the retrieval of steps S1 and S2 is finished, the packets of 312 through 322 of packet logs PS1 through PS1 and PR1 through PR2 are output in step S3, and stored in the application log 41. This process is repeated until there are no records of packet log 30 remaining in step S4.

Figure 20:
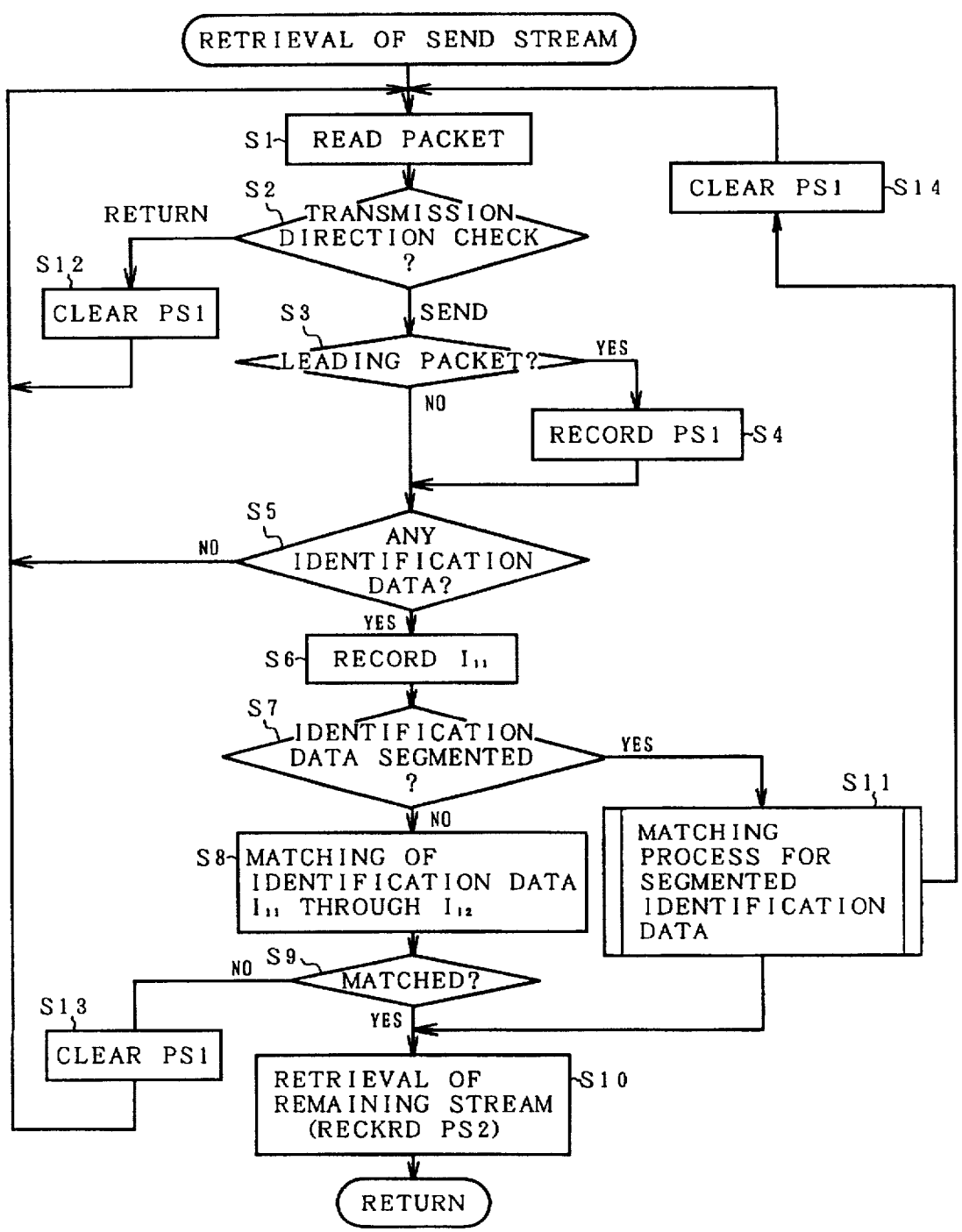
FIG. 20 is a detailed flowchart showing the retrieval process of the outbound conversation stream shown in FIG. 18.

FIG. 20 is a detailed diagram of the retrieval process of the send conversation stream shown in step S1 of FIG. 18. Giving description with reference to FIG. 19, first, in step S1, packets are read, and in step S2, the transfer direction is checked, whether it is an outbound stream or returning stream. In the case that it is an outbound stream, the process proceeds to step S3, and determines whether it is inverted or not in the direction of one packet earlier, to judge whether or not it is the leading packet. If it is the leading packet, the process proceeds to step S4, and records the packet log PS1 which indicates the starting position of the packet data. If not the leading packet, recording of the packet log PS1 is not conducted in step S4. Further, in the case that it has been identified as a return stream in step S2, the packet log PS1 is cleared in step S12, and the process returns to step S1. In step S5, the packet being presently processed is checked for whether there is identification data therein or not. If there is identification data 304 as with packet 314 in FIG. 19, the process proceeds to step S6, where the offset I11 which indicates the starting position of the identification data is recorded, and in step S7, whether the identification data is segmented or not is checked. If the identification data is segmented, the process proceeds to step S11. In the event that the identification data is not segmented, the process proceeds to step S8, and matches the identification data of the offsets I11 and I12 with the identification data set with the sequence filter. If this matching shows in step S9 that these do match, the process proceeds to step S10, where retrieval of the rest of the stream is conducted. i.e., retrieval is conducted to the final send packet 316, as shown in FIG. 19, and packet log PS2 which indicates the data starting position thereof is recorded. If the matching shows in step S9 that these do not match, this means that the packet is not the packet which is to be retrieved, so the packet log PS1 is cleared in step S13, and the process returns to step S1 and proceeds to process the next packet.

Figure 21:
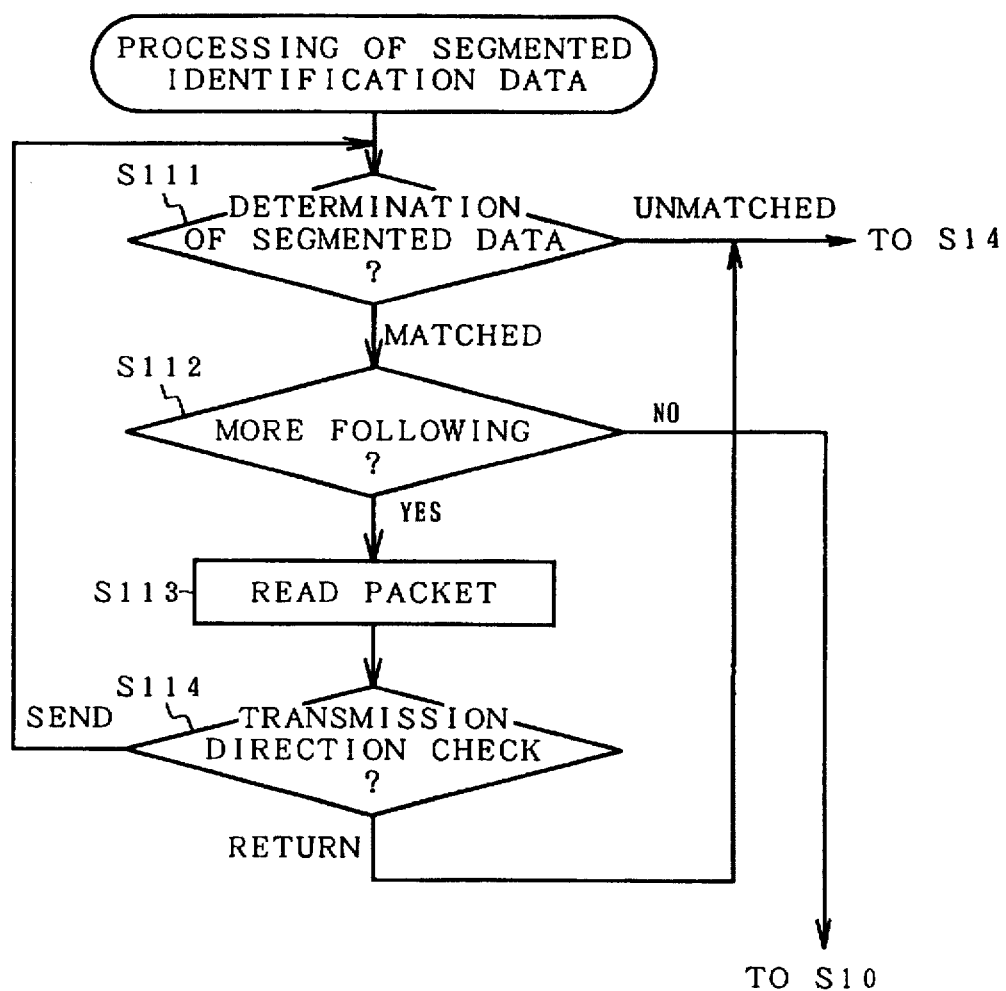
FIG. 21 is a detailed flowchart showing the retrieval process in the event that the identification data in FIG. 20 has been segmented.
Figure 22A:
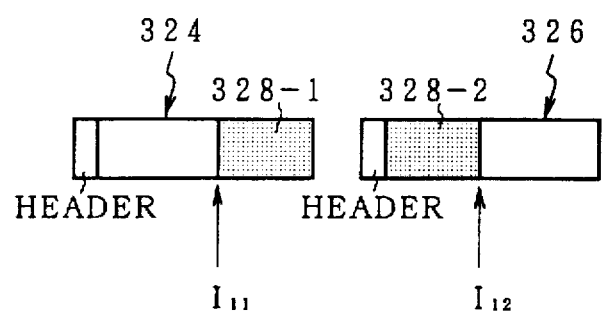
FIGS. 22A and 22B are explanatory diagrams showing packet segmentation of identification data.
Figure 22B:
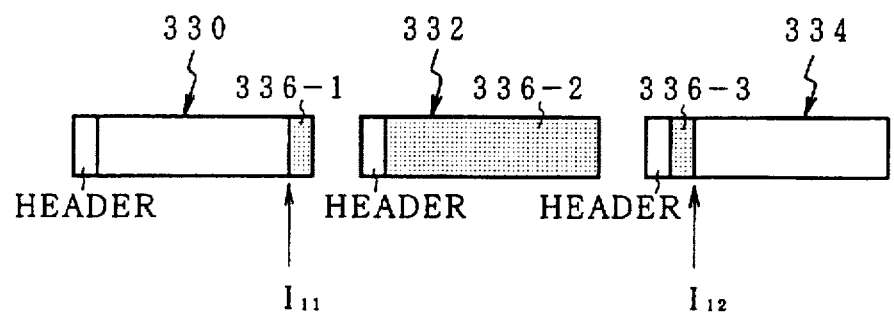

FIG. 21 is a detailed diagram of the matching process of segmented identification as shown in step S11 of FIG. 20. As for forms of segmentation of the identification data with regard to the packets, there are cases where the segmented identification data exists as 328-1 and 328-2 in two packets 324 and 326, as shown in FIG. 22A, and where the segmented identification data exists as 336-1, 336-2, and 336-3, in three packets 330, 332, and 334, as shown in FIG. 22B. Of course, there may be cases where the segmentation may carry over into 4 or more packets. Regarding the processing in FIG. 21, judgment is passed based on matching conducted in step S111 with the portion corresponding to the identification data set in the sequence filter regarding the first segmented data. If matching, the process proceeds to step S112, and judgment is passed on whether or not there is continuation. If there is continuation, the next packet is read in step S113, and the transfer direction is checked in step S114. In the event that the transfer direction is outbound, the process returns to step S111, and conducts matching of the subsequent segmented identification data. If there is no continuation of identification data in step S112, this means that matching of all segmented data has been completed, so the process returns to step S10 of FIG. 20. In the event that the during processing of the segmented data, the matching shows in step S111 that there is no match, or if the transfer direction becomes return in step S114, this means that the identification data was not retrieved, so the packet log PS1 is cleared in step S14 of FIG. 20, and the process returns to step S1. This is basically the same for retrieval of return conversation stream of step S2 in FIG. 18. Further, regarding the protocol packets 308 and 306 of FIG. 19, in order to simplify explanation, the example given is where the identification data 304 and 306 exist only in the packet payload (data portion), however, generally, the identification data of the protocol packets are separated into portions which exist in the header and portions which exist in the payload, both being put together to comprise the identification data.

Figure 23:
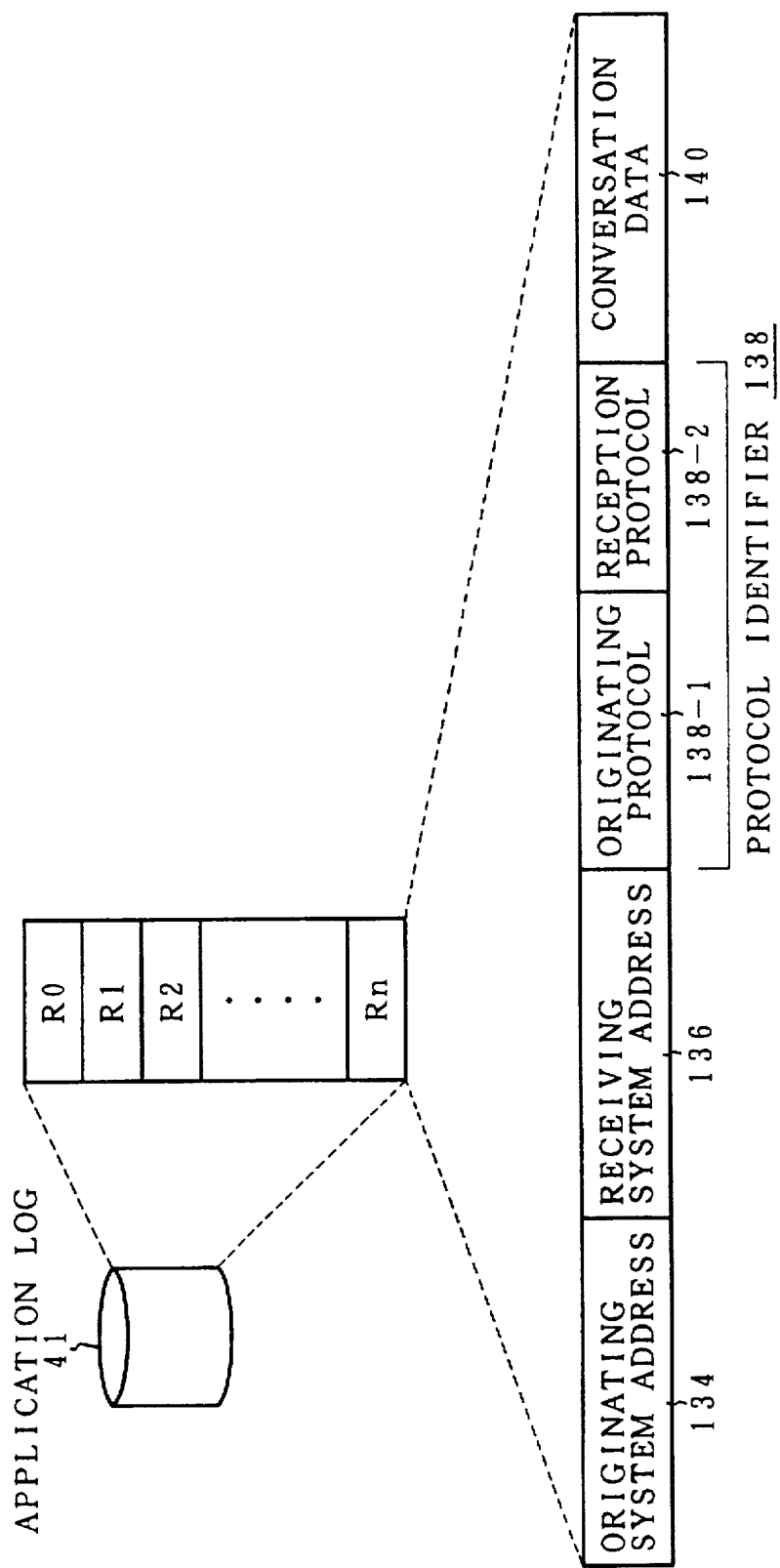
FIG. 23 is an explanatory diagram of the application log shown in FIG. 1.
Figure 24:
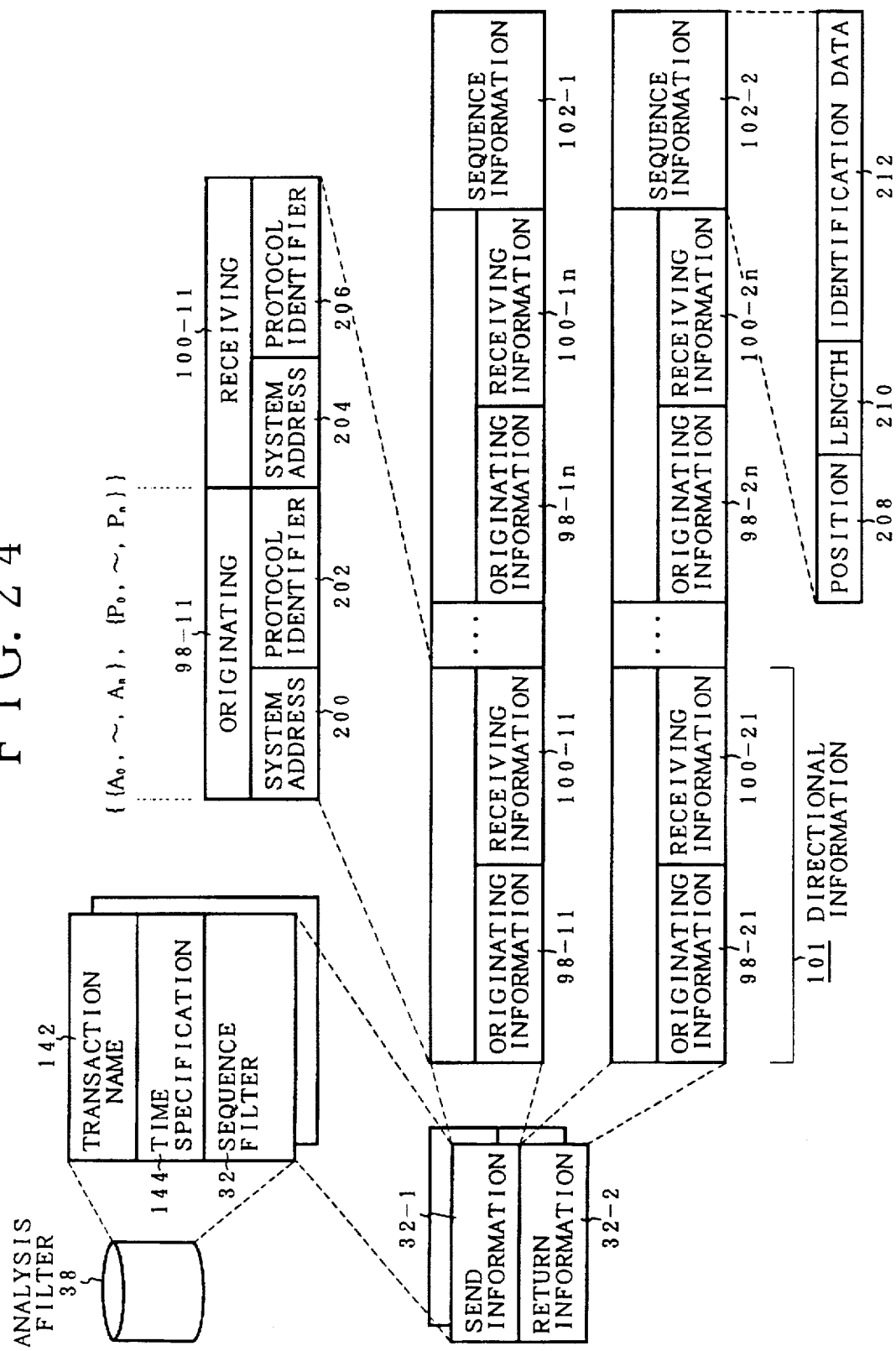
FIG. 24 is an explanatory diagram of the analysis filter shown in FIG. 1.

FIG. 23 shows the make-up of the application log 41 shown in FIG. 1, the record form is the same as the packet log 30 in FIG. 5. As explanation is given regarding packet record Rn, the configuration thereof is comprised of originating system address 134, receiving system address 136, protocol identifier 138, and conversation data 140, while the protocol identifier 138 is comprised of originating protocol 138-1 and reception protocol 138-2. When the filter creation module 24 shown in FIG. 1 creates the sequence filter 32, the analysis filter 38 to be used with the performance analysis module 42 is also created simultaneously. FIG. 24 shows the make-up of the analysis filter 38, and as with the case of the extraction filter 36 shown in FIG. 6, is comprised of transaction name 142, time specification 144, and sequence filter 32. The sequence filter 32 is also comprised of send information 32-1 and return information 32-2. Regarding this analysis filter 38, a sequence filter 32 exactly the same as the extraction filter 36 may be used, or a dedicated analysis filter may be created separate to the sequence filter 32 of the extraction filter 36.

Figure 25:
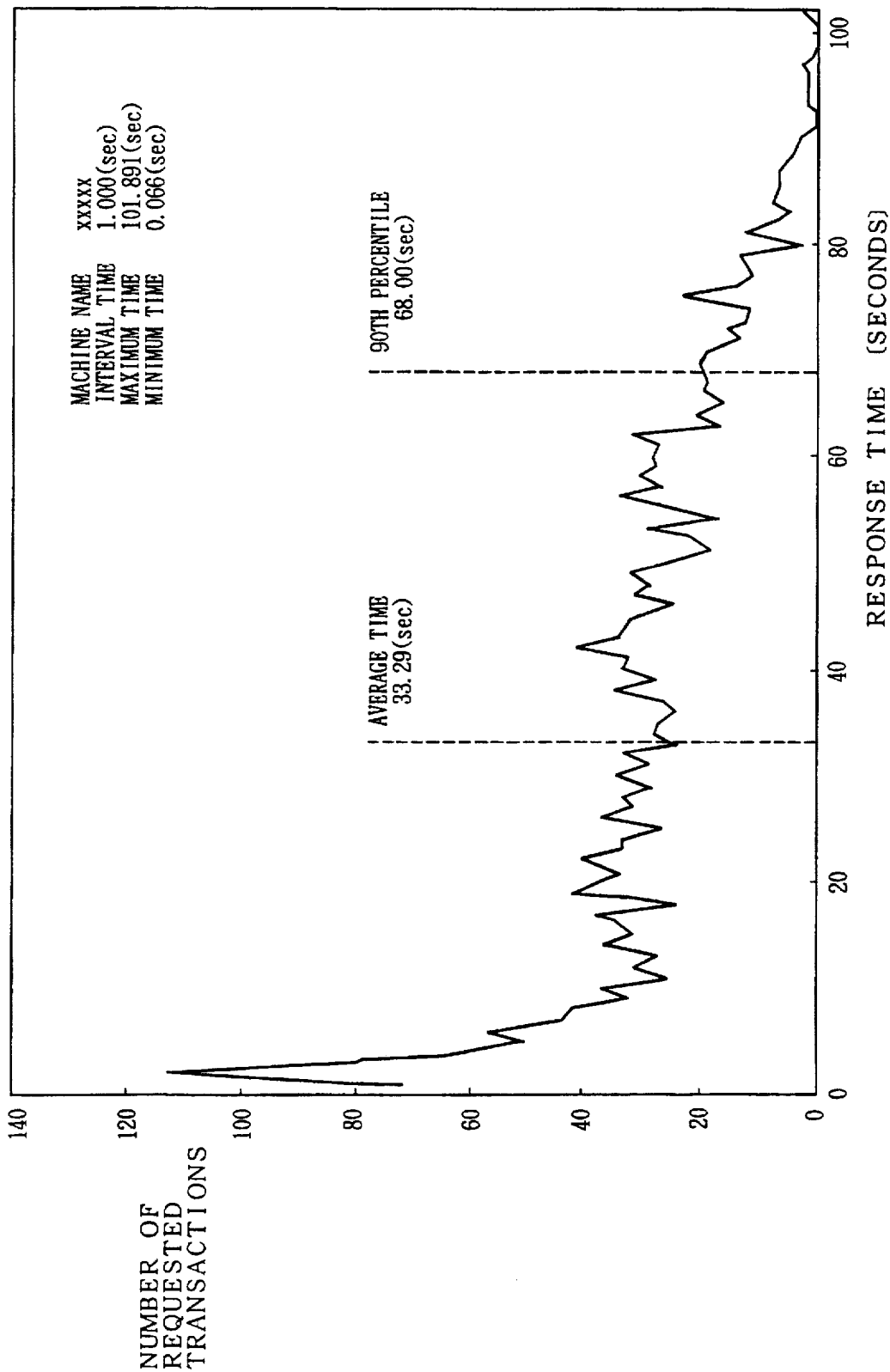
FIG. 25 is an explanatory diagram of the analysis graph regarding number of transactions as compared with response time, according to the graph display module shown in FIG. 1.
Figure 26:
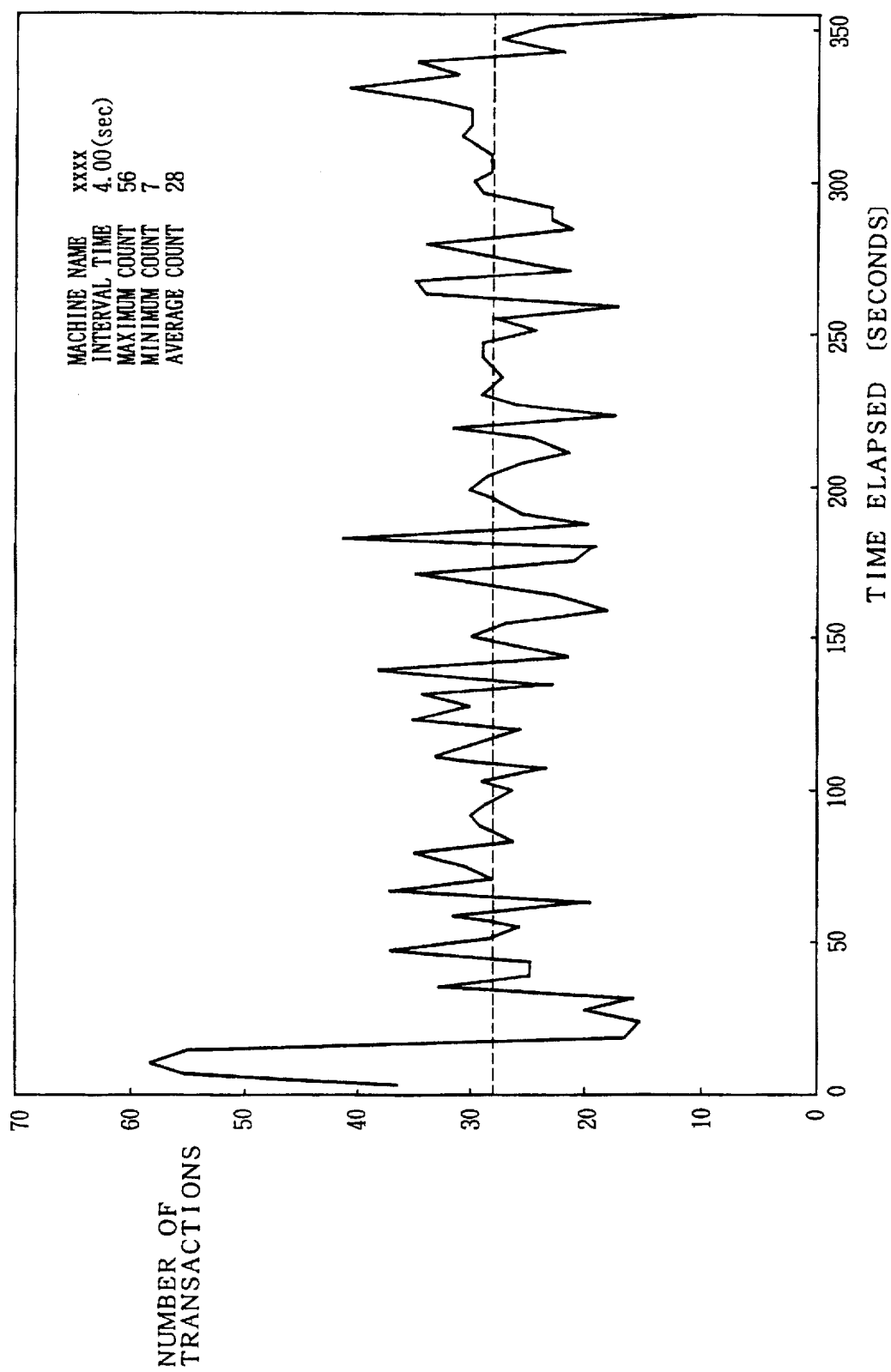
FIG. 26 is an analysis graph regarding the number of requested transactions as compared with elapsed time, according to the graph display module shown in FIG. 1.

Referring again to FIG. 1, the performance analysis module 42 conducts pattern matching of packet record against sequence information of the sequence filter 32 contained in the analysis filter 38, in the same way as with FIG. 7A, regarding the application log 41. The performance analysis module also conducts extraction of conversation data to be analyzed from the application log 41, and conducts performance analysis. The contents of the analysis according to the performance analysis module 42 are: response analysis specified by the analysis type 64 of the trace instruction file 20 shown in FIG. 5; through-put analysis; client processing time; server processing time; transaction transition; etc. The analysis results of such an performance analysis module 42 are stored in performance record files 44-1 through 44-n. The graph display module 46 conducts displaying of a graph on the display 48, based on the analysis results of the performance analysis module 42 and the layout information 65. FIG. 25 is an example of graph display 48 according to this graph display module 46, and is a response distribution graph. This response distribution graph shows the response time from origination to reception as the horizontal axis, and the number of transactions for each response time as the vertical axis. Further, also on the graph are displayed: the originating system name and measurement interval 1.0 sec. upon conducting analysis processing; maximum response time 101.891 sec. and minimum response time 0.066 sec.; and the average response time 33.29 sec. and the 90% pile response time 68.00 sec. for times for which the response time was not the same. FIG. 26 is another example of the graph display 48 shown in FIG. 1, i.e., a transaction transition graph, wherein the horizontal axis represents relative time passage with the starting time as 0, and the vertical axis represents the number of transactions with the interval time as 4.0 seconds. With this display graph, the maximum number of transactions is 56, the minimum number of transactions is 7, and the average number of transactions is 28. In the event that special graph display is conducted by the graph display module 46 that is according to other than the instruction contents of the trace instruction file 20 shown in FIG. 3, the graph display information is stored in the trace hysteresis file 22 provided in the trace control module 18.

Figure 27:
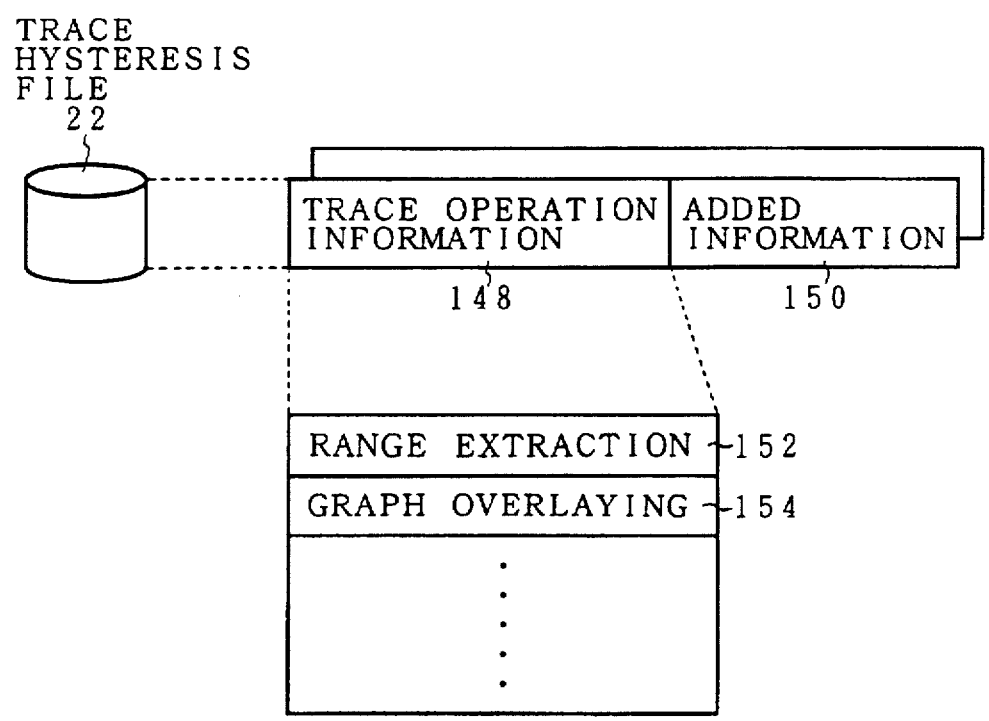
FIG. 27 is an explanatory diagram of the trace hysteresis file shown in FIG. 1.

FIG. 27 is the make-up of the trace hysteresis file 22. The trace hysteresis file 22 contains trace operation information 148 and added information 150. Special trace operation information 148 which is not instructed in the trance instruction file 20, such as range extraction 152 and graph overlay displaying 154, etc., are stored in the trace operation information. Accordingly, the graph display module 46 is capable of re-displaying a graph special trace operation information 148 of the trace hysteresis file 22 such as range extraction 152 and graph overlay displaying 154, etc., already obtained as analysis results. Further, the hysteresis information of the trace hysteresis file 22 can be reflected in the layout information 65-1 through 65-4 of the trace instruction file 20 shown in FIG. 3, according to the analysis instruction contents. For example, special range extraction and graph overlay displaying trace obtained from the hysteresis file 22 can be stored in layout information 65-1 through 65-4 as standard instruction information, to be specified by the user. This allows for effective usage of hysteresis information.

According to the present invention as described above, the user can extract an application log from a desired transaction without giving consideration to protocol, thereby making unnecessary the performance analysis programs which have been conventionally compiled protocol-specific and application-specific. Further, there is no need of in-depth knowledge of protocols, since the series of programs which actualizes the tracing apparatus can conduct performance analysis by extracting application logs of necessary transactions within any protocol.

Moreover, while the aforementioned embodiment has been described according to an example where the tracing apparatus 10 of the present invention is applied to a server-client system, but the present invention can be applied to a computer network which is comprised of a host computer and terminals, in exactly the same manner. Also, the various processing functions of the tracing apparatus 10 shown in FIG. 1 may be realized by means of application program software for the computer to be used for the tracing apparatus 10, or, dedicated hardware may be used, as necessary. Furthermore, real-time processing can be achieved by using internal memory for the packet log 30 and application log 41 instead of an external hard drive, regarding the following series of processing with the tracing apparatus 10: packet log collection; extraction of application log; performance analysis; and graph display. Moreover, in the event that the packet log 30 is provided from a separate apparatus, the tracing apparatus of the present invention is of a system configuration wherein the collection filter 26 and line collection module 28 are deleted from FIG. 1. Of course, the line collection filter 26 compilation function of the filter creation module 24 also becomes unnecessary.

What is claimed is:

1. A transaction tracing apparatus for a computer network having a plurality of units connected via a transfer path, wherein transactions are processed by exchange of transmission information using a conversational format of request and reply between at least two units, said transaction tracing apparatus comprising:

a trace control module which controls the transaction tracing apparatus based on a trace instruction file having a log file name, a filter file name, and analysis instructions having corresponding specification information;

a filter creation module which creates an extraction filter and an analysis filter used in the extraction of a particular conversation sequence from a packet log;

a line collection module which collects transmission information from said transfer path thereby creating a transmission log;

an application log extraction module which extracts from the transmission log an application log of the particular conversation sequence specified by the extraction filter;

a performance analysis module which extracts the particular conversation sequence, specified by the analysis filter, from said application log, and analyzes the transaction producing an analysis result;

and a graph display module which displays graphs based on the analysis results of said performance analysis module.

2. An apparatus according to claim 1, wherein the filter file name of said trace instruction file is a collection filter name and an analysis filter name.

3. An apparatus according to claim 2, wherein the analysis instruction of said trace instruction file includes an analysis type and layout information.

4. An apparatus according to claim 3, wherein said analysis type includes a response analysis, a throughput analysis, a client processing time, a server processing time, and a transaction transition, and said layout information includes comments, a threshold value, a display position, and a size.

5. An apparatus according to claim 1, wherein said filter creation module creates line collection filters to be used for packet log collection, and said line collection module collects transmission information specified by said collection filter in the form of transmission log from said transfer path.

6. An apparatus according to claim 5, wherein said collection filter is comprised of at least: a collection time; originating information including an originating system address and an originating protocol identifier; and receiving information including a receiving system address and a reception protocol identifier;

wherein said line collection module collects communication information corresponding to any one of the pieces of said collection information, or a combination of multiple pieces thereof, in the form of a communication log.

7. An apparatus according to claim 1, wherein said extraction filter is comprised of a transaction name, a time specification, and a sequence filter, and wherein said analysis filter is comprised of a transaction name, a time specification, and a sequence filter.

8. An apparatus according to claim 7, wherein said sequence filter is comprised of: send information indicating sending information; and return information indicating returning information.

9. An apparatus according to claim 7, wherein each of said send information and return information are comprised of: directional information comprised of originating information and receiving information comprised of unit address and protocol identifier; identification data; and sequence information which includes the position and length thereof.

10. An apparatus according to claim 9, wherein each of said send information and return information contain multiple pieces of directional information comprised of said originating information and receiving information regarding a single piece of sequence information.

11. An apparatus according to claim 9, wherein said filter creation module creates said sequence filters using pattern filters prepared beforehand for each protocol.

12. An apparatus according to claim 11, wherein said pattern filters have registered therein elements corresponding to the send information and returning information for each of the protocols, so that a sequence filter is automatically created by means of selection of corresponding elements from said pattern filter based on user protocol selection and element selection, and further, by means of selecting corresponding elements from the selection elements based on input of user system address, protocol identifier, identification data, and time.

13. An apparatus according to claim 1, wherein said performance analysis module conducts at least a response analysis, a throughput analysis, client processing time, server processing time, and transaction transition, as necessary.

14. An apparatus according to claim 1, wherein said trace control module possesses a trace hysteresis file, and in the event that displaying of a graph of analyzed performance other than that of the information specified by said trace instruction file is conducted within said graph display module, said graph information is stored in said trace hysteresis file.

15. An apparatus according to claim 14, wherein said trace hysteresis file possesses trace operation information including range extraction and graph overlaying, and conducts graph displaying according to specification of said trace operation information of the graph stored in said trace hysteresis file, by means of said graph display module.

16. An apparatus according to claim 1, wherein said computer network is a client-server system which is comprised of server and clients.

17. A transaction tracing apparatus comprising:

a trace control module which controls the transacting tracing apparatus based on a trace instruction file having a log file name, a filter name, and analysis instructions having corresponding specification information;

a filter creation module which creates an extraction filter and an analysis filter used in the extraction of a particular conversation sequence from a packet log;

an application log extraction module which extracts, from a transmission log collected from a transfer path of a computer network, an application log of the particular conversation sequence specified by the extraction filter;

a performance analysis module which extracts the particular conversation sequence, specified by the analysis filter, from the application log, and analyzes the transaction producing an analysis result;

and a graph display module which displays graphs based on the analysis results of said performance analysis module.

* * * * *